(12) United States Patent
Jhang et al.

(10) Patent No.: US 12,468,122 B2
(45) Date of Patent: Nov. 11, 2025

(54) OPTICAL IMAGING LENS COMPRISING NINE LENS ELEMENTS

(71) Applicant: GENIUS ELECTRONIC OPTICAL (XIAMEN) CO., LTD., Fujian (CN)

(72) Inventors: Jia-Sin Jhang, Fujian (CN); Maozong Lin, Fujian (CN); Jiahong Chen, Fujian (CN)

(73) Assignee: GENIUS ELECTRONIC OPTICAL (XIAMEN) CO., LTD., Fujian (CN)

( * ) Notice: Subject to any disclaimer, the term of this patent is extended or adjusted under 35 U.S.C. 154(b) by 686 days.

(21) Appl. No.: 17/861,251

(22) Filed: Jul. 11, 2022

(65) Prior Publication Data
US 2023/0221527 A1 Jul. 13, 2023

(30) Foreign Application Priority Data
Jan. 12, 2022 (CN) .......................... 202210033186.5

(51) Int. Cl.
*G02B 9/64* (2006.01)
(52) U.S. Cl.
CPC ....................................... *G02B 9/64* (2013.01)
(58) Field of Classification Search
None
See application file for complete search history.

(56) References Cited

U.S. PATENT DOCUMENTS

| 7,800,835 B2 | 9/2010 | Zuhara et al. |
| 9,983,389 B2 | 5/2018 | Lee |
| 2020/0209594 A1* | 7/2020 | Hirano ............... G02B 13/0045 |

FOREIGN PATENT DOCUMENTS

| CN | 111766686 A | * 10/2020 | ......... G02B 13/0045 |
| CN | 112987257 | 6/2021 | |
| CN | 112987257 A | * 6/2021 | ......... G02B 13/0045 |
| TW | I690726 | 4/2020 | |

OTHER PUBLICATIONS

"Office Action of Taiwan Counterpart Application", issued on Jun. 27, 2023, p. 1-p. 12.

* cited by examiner

*Primary Examiner* — Paul C Lee
(74) *Attorney, Agent, or Firm* — JCIPRNET

(57) ABSTRACT

Provided is an optical imaging lens, including a first lens element, a second lens element, a third lens element, a fourth lens element, a fifth lens element, a sixth lens element, a seventh lens element, an eighth lens element, and a ninth lens element sequentially arranged along an optical axis from an object side to an image side. The first lens element has positive refracting power, while the second lens element has negative refracting power. An optical axis region of the image-side surface of the fifth lens element is convex, while an optical axis region of the image-side surface of the seventh lens element is concave. The eighth lens element has positive refracting power or the ninth lens element has negative refracting power.

7 Claims, 21 Drawing Sheets

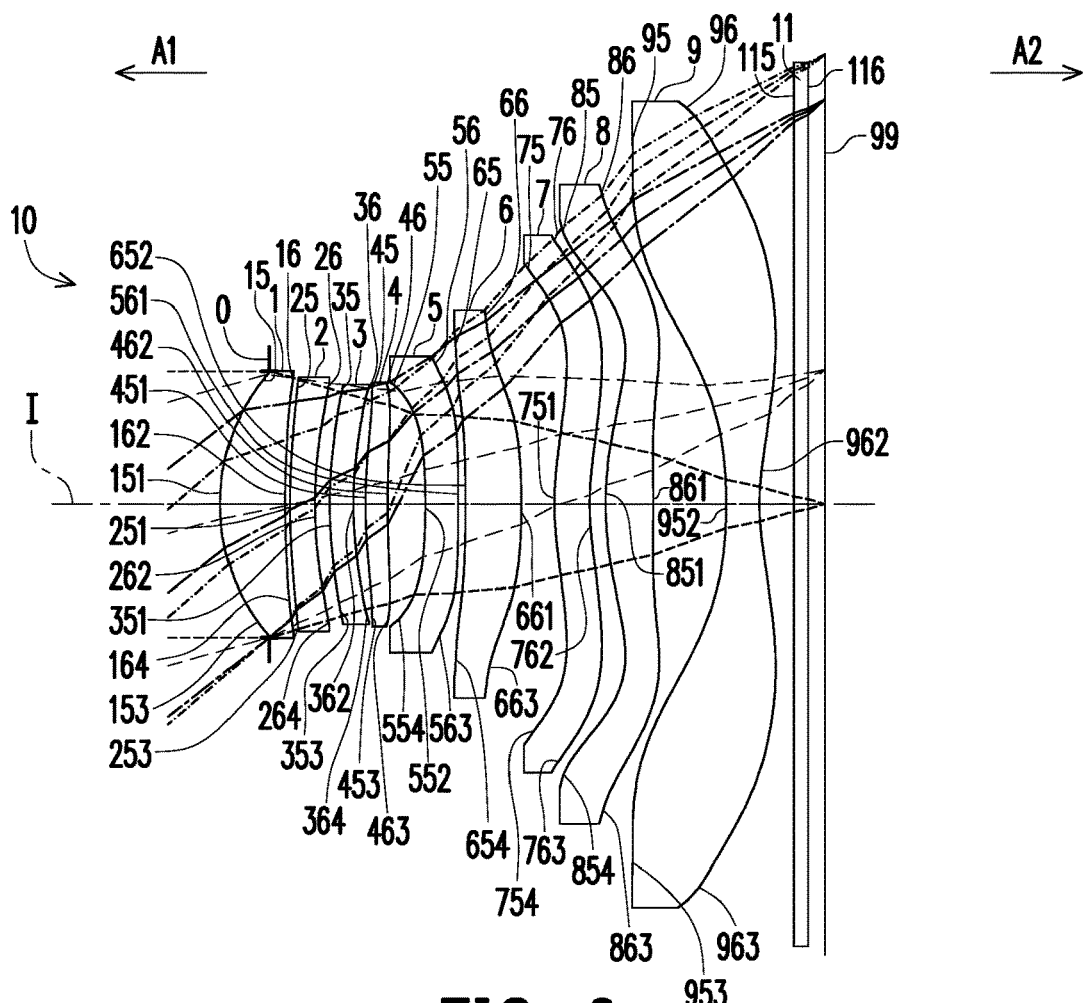
FIG. 6
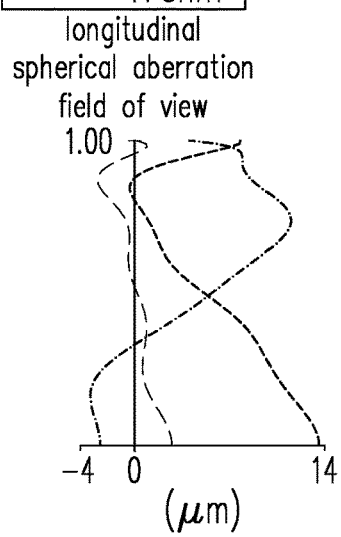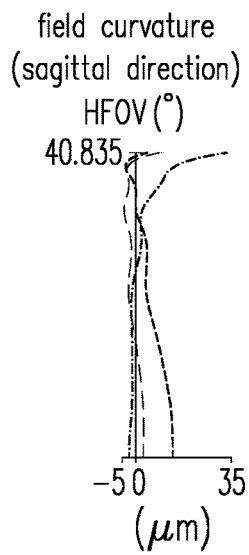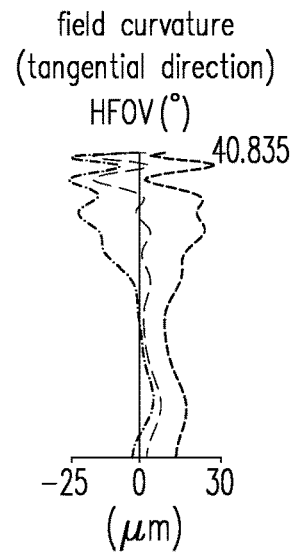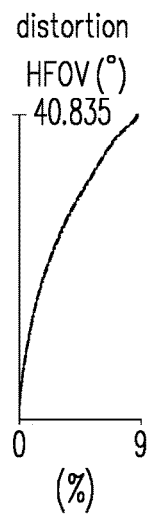
FIG. 7A  FIG. 7B  FIG. 7C  FIG. 7D

| First embodiment | | | | | | |
|---|---|---|---|---|---|---|
| EFL = 7.135 mm, HFOV = 40.835°, TTL = 8.996 mm, Fno = 1.800, ImgH = 6.700 mm | | | | | | |
| Element | Surface | Radius of curvature (mm) | Gap (mm) | Refractive index | Abbe number | Focal length (mm) |
| Object | | Infinity | Infinity | | | |
| Aperture 0 | | Infinity | -0.728 | | | |
| First lens element 1 | Object-side surface 15 | 3.076 | 0.960 | 1.545 | 55.987 | 7.050 |
| | Image-side surface 16 | 13.592 | 0.076 | | | |
| Second lens element 2 | Object-side surface 25 | 10.971 | 0.370 | 1.671 | 19.243 | -23.566 |
| | Image-side surface 26 | 6.414 | 0.222 | | | |
| Third lens element 3 | Object-side surface 35 | 6.903 | 0.355 | 1.671 | 19.243 | -101.501 |
| | Image-side surface 36 | 6.143 | 0.180 | | | |
| Fourth lens element 4 | Object-side surface 45 | 8.282 | 0.328 | 1.545 | 55.987 | 30.574 |
| | Image-side surface 46 | 16.199 | 0.563 | | | |
| Fifth lens element 5 | Object-side surface 55 | -11.694 | 0.491 | 1.671 | 19.243 | -19.841 |
| | Image-side surface 56 | -91.397 | 0.105 | | | |
| Sixth lens element 6 | Object-side surface 65 | -27.626 | 0.824 | 1.545 | 55.987 | 48.231 |
| | Image-side surface 66 | -13.628 | 0.496 | | | |
| Seventh lens element 7 | Object-side surface 75 | 4.758 | 0.527 | 1.661 | 20.373 | 1372.922 |
| | Image-side surface 76 | 4.571 | 0.233 | | | |
| Eighth lens element 8 | Object-side surface 85 | 4.719 | 0.712 | 1.545 | 55.987 | 7.291 |
| | Image-side surface 86 | -24.159 | 1.088 | | | |
| Ninth lens element 9 | Object-side surface 95 | -7.603 | 0.499 | 1.535 | 55.711 | -4.881 |
| | Image-side surface 96 | 4.095 | 0.503 | | | |
| Filter 11 | Object-side surface 115 | Infinity | 0.210 | 1.517 | 64.167 | |
| | Image-side surface 116 | Infinity | 0.255 | | | |
| | Image plane 99 | Infinity | | | | |

FIG. 8

| Surface | K | $a_4$ | $a_6$ | $a_8$ | $a_{10}$ |
|---|---|---|---|---|---|
| 15 | 5.180118E-02 | 5.927940E-04 | -1.937366E-04 | 3.436632E-04 | -2.151418E-04 |
| 16 | 0.000000E+00 | -5.690834E-04 | -5.730777E-03 | 5.638552E-03 | -2.664350E-03 |
| 25 | 6.669180E-01 | -1.343623E-03 | -8.803051E-03 | 8.246976E-03 | -3.858340E-03 |
| 26 | -2.522200E+00 | 1.918577E-03 | -7.597704E-03 | 5.831643E-03 | -2.791299E-03 |
| 35 | -2.049159E+00 | -8.385254E-04 | -4.714970E-03 | 4.099134E-03 | -2.569141E-03 |
| 36 | 4.007173E+00 | -7.730733E-03 | -1.069996E-03 | 1.725381E-03 | -1.289759E-03 |
| 45 | 0.000000E+00 | -7.341526E-03 | -2.021800E-03 | 3.869950E-03 | -5.280576E-03 |
| 46 | 0.000000E+00 | -4.531209E-03 | -2.126177E-03 | 1.470434E-03 | -1.044981E-03 |
| 55 | 0.000000E+00 | -1.990561E-02 | -3.266599E-03 | -5.504164E-03 | 1.012746E-02 |
| 56 | 0.000000E+00 | -8.351415E-03 | -1.082686E-02 | 5.956142E-03 | -2.474903E-03 |
| 65 | -4.517071E+00 | -2.588247E-03 | -4.595166E-03 | 2.137743E-03 | -2.459170E-04 |
| 66 | 0.000000E+00 | -2.754770E-02 | 8.008709E-03 | -3.255339E-03 | 1.358519E-03 |
| 75 | -1.110130E+01 | -1.614180E-02 | 5.792130E-03 | -2.189015E-03 | 5.640203E-04 |
| 76 | -8.072869E+00 | -2.337943E-02 | 7.831845E-03 | -2.281556E-03 | 4.684934E-04 |
| 85 | -2.414725E-01 | -1.079843E-02 | 1.079651E-03 | -2.684231E-04 | 1.903736E-06 |
| 86 | -1.310237E+01 | 2.333426E-02 | -4.907447E-03 | 5.396568E-04 | -6.039466E-05 |
| 95 | -3.138801E-01 | -1.694080E-02 | 3.090954E-03 | -3.514877E-04 | 3.092913E-05 |
| 96 | -1.027272E+01 | -1.378491E-02 | 2.208697E-03 | -2.617899E-04 | 2.056983E-05 |
| Surface | $a_{12}$ | $a_{14}$ | $a_{16}$ | $a_{18}$ | $a_{20}$ |
| 15 | 7.742816E-05 | -1.461623E-05 | 1.137794E-06 | 0.000000E+00 | 0.000000E+00 |
| 16 | 7.422922E-04 | -1.161100E-04 | 7.929630E-06 | 0.000000E+00 | 0.000000E+00 |
| 25 | 1.080521E-03 | -1.717228E-04 | 1.187757E-05 | 0.000000E+00 | 0.000000E+00 |
| 26 | 9.014074E-04 | -1.813782E-04 | 1.640365E-05 | 0.000000E+00 | 0.000000E+00 |
| 35 | 1.110999E-03 | -2.658991E-04 | 2.642417E-05 | 0.000000E+00 | 0.000000E+00 |
| 36 | 5.697660E-04 | -1.232674E-04 | 1.117433E-05 | 0.000000E+00 | 0.000000E+00 |
| 45 | 4.265291E-03 | -2.184966E-03 | 6.811858E-04 | -1.143958E-04 | 7.807795E-06 |
| 46 | 1.502234E-04 | 1.945570E-04 | -1.384116E-04 | 3.872836E-05 | -4.150080E-06 |
| 55 | -9.228854E-03 | 4.896880E-03 | -1.548912E-03 | 2.711773E-04 | -2.030773E-05 |
| 56 | 8.298377E-04 | -2.082957E-04 | 3.655207E-05 | -3.902997E-06 | 1.895902E-07 |
| 65 | -5.043159E-05 | 2.221041E-05 | -3.543058E-06 | 2.809017E-07 | -9.277563E-09 |
| 66 | -3.703521E-04 | 6.309746E-05 | -6.444265E-06 | 3.581121E-07 | -8.321986E-09 |
| 75 | -9.520976E-05 | 1.002436E-05 | -6.334262E-07 | 2.215901E-08 | -3.326230E-10 |
| 76 | -6.502985E-05 | 5.780283E-06 | -3.108042E-07 | 9.154918E-09 | -1.129800E-10 |
| 85 | 4.596566E-06 | -5.759899E-07 | 3.328618E-08 | -9.728260E-10 | 1.153800E-11 |
| 86 | 6.345729E-06 | -4.511914E-07 | 1.899044E-08 | -4.274900E-10 | 3.967000E-12 |
| 95 | -1.889850E-06 | 7.445093E-08 | -1.791092E-09 | 2.388300E-11 | -1.350000E-13 |
| 96 | -1.043693E-06 | 3.333094E-08 | -6.397180E-10 | 6.691000E-12 | -2.900000E-14 |

FIG. 9

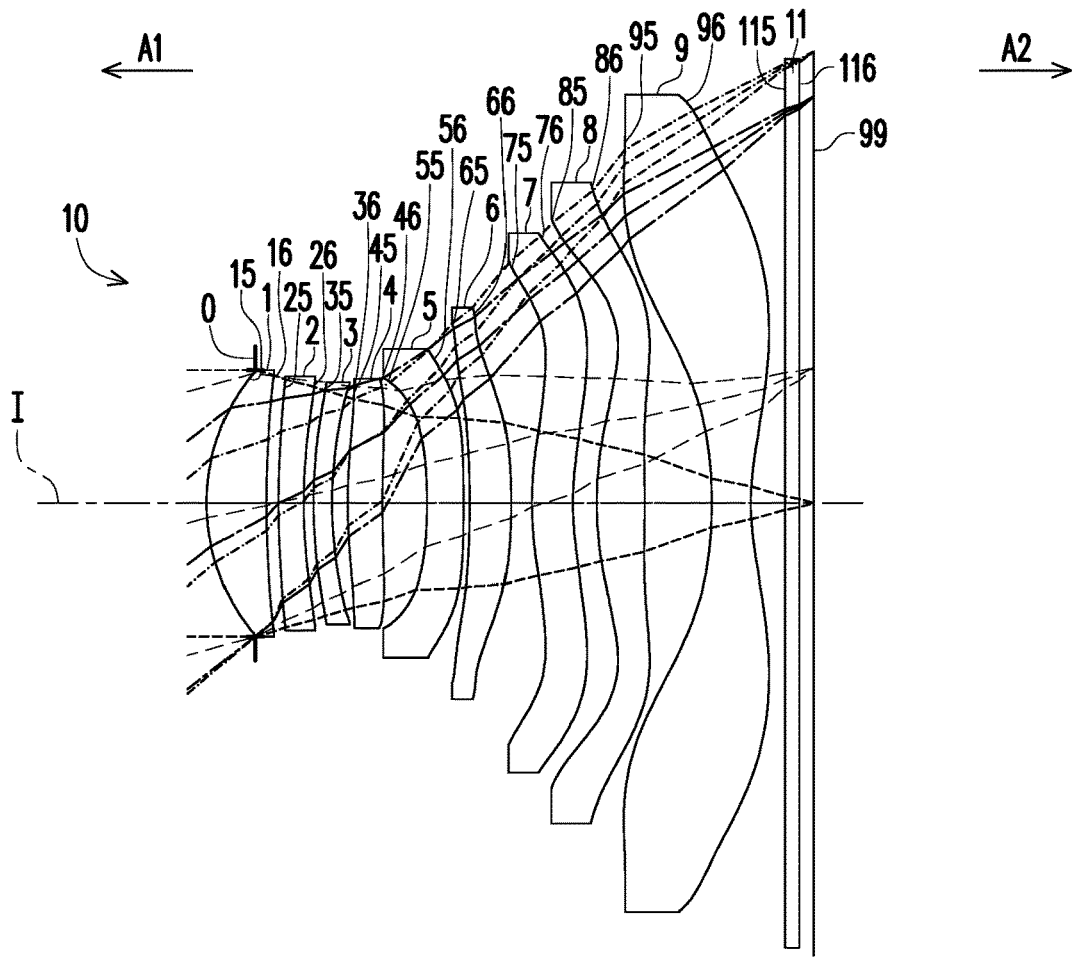
FIG. 10
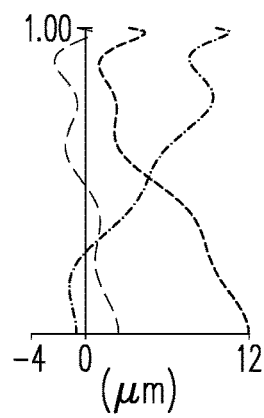
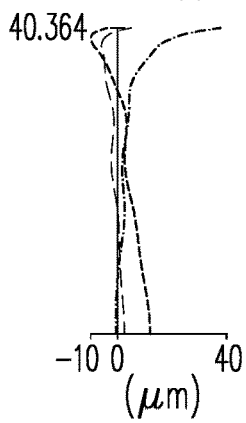
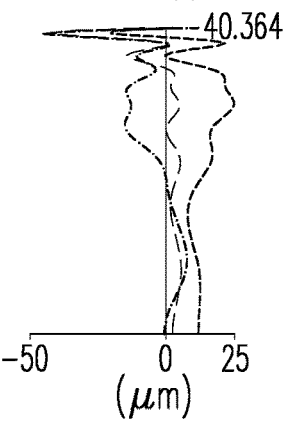
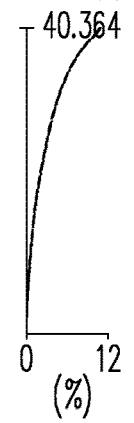
FIG. 11A   FIG. 11B   FIG. 11C   FIG. 11D

| Second embodiment |||||||
|---|---|---|---|---|---|---|
| EFL = 7.115 mm, HFOV = 40.364°, TTL = 8.988 mm, Fno = 1.800, ImgH = 6.700 mm |||||||
| Element | Surface | Radius of curvature (mm) | Gap (mm) | Refractive index | Abbe number | Focal length (mm) |
| Object | | Infinity | Infinity | | | |
| Aperture 0 | | Infinity | -0.714 | | | |
| First lens element 1 | Object-side surface 15 | 3.074 | 0.878 | 1.545 | 55.987 | 6.946 |
| | Image-side surface 16 | 14.553 | 0.182 | | | |
| Second lens element 2 | Object-side surface 25 | 12.965 | 0.372 | 1.671 | 19.243 | -29.358 |
| | Image-side surface 26 | 7.758 | 0.146 | | | |
| Third lens element 3 | Object-side surface 35 | 7.078 | 0.275 | 1.671 | 19.243 | -44.823 |
| | Image-side surface 36 | 5.650 | 0.234 | | | |
| Fourth lens element 4 | Object-side surface 45 | 8.205 | 0.518 | 1.545 | 55.987 | 26.294 |
| | Image-side surface 46 | 18.709 | 0.658 | | | |
| Fifth lens element 5 | Object-side surface 55 | -8.534 | 0.544 | 1.671 | 19.243 | -16.940 |
| | Image-side surface 56 | -34.131 | 0.092 | | | |
| Sixth lens element 6 | Object-side surface 65 | -17.357 | 0.607 | 1.545 | 55.987 | 66.013 |
| | Image-side surface 66 | -11.862 | 0.306 | | | |
| Seventh lens element 7 | Object-side surface 75 | 4.502 | 0.612 | 1.661 | 20.373 | 95.289 |
| | Image-side surface 76 | 4.582 | 0.350 | | | |
| Eighth lens element 8 | Object-side surface 85 | 4.749 | 0.713 | 1.545 | 55.987 | 7.184 |
| | Image-side surface 86 | -21.410 | 0.995 | | | |
| Ninth lens element 9 | Object-side surface 95 | -8.051 | 0.585 | 1.535 | 55.711 | -4.830 |
| | Image-side surface 96 | 3.926 | 0.503 | | | |
| Filter 11 | Object-side surface 115 | Infinity | 0.210 | 1.517 | 64.167 | |
| | Image-side surface 116 | Infinity | 0.207 | | | |
| | Image plane 99 | Infinity | | | | |

FIG. 12

| Surface | K | $a_4$ | $a_6$ | $a_8$ | $a_{10}$ |
|---|---|---|---|---|---|
| 15 | 2.061821E-02 | 4.004603E-04 | -4.736361E-05 | 1.103903E-04 | -6.802078E-05 |
| 16 | 0.000000E+00 | -2.036642E-03 | -1.213700E-03 | 1.456205E-03 | -6.520975E-04 |
| 25 | 1.140808E+00 | -2.615097E-03 | -4.564368E-03 | 4.324529E-03 | -1.946188E-03 |
| 26 | -3.382172E+00 | 4.679767E-03 | -9.662101E-03 | 6.108355E-03 | -2.567139E-03 |
| 35 | -1.627840E+00 | 1.997872E-03 | -6.175263E-03 | 3.993262E-03 | -2.054776E-03 |
| 36 | 3.900502E+00 | -9.630813E-03 | 8.429662E-04 | -7.394150E-05 | 4.435235E-05 |
| 45 | 0.000000E+00 | -9.521332E-03 | -8.690829E-04 | 2.226767E-03 | -3.445618E-03 |
| 46 | 0.000000E+00 | -5.534188E-03 | 1.544581E-04 | -3.230499E-03 | 4.142232E-03 |
| 55 | 0.000000E+00 | -2.135718E-02 | 1.154409E-03 | -9.350498E-03 | 1.173141E-02 |
| 56 | 0.000000E+00 | -1.088570E-02 | -6.781115E-03 | 2.841823E-03 | -1.086655E-03 |
| 65 | 4.365048E+00 | 1.071337E-04 | -6.926416E-03 | 3.648081E-03 | -1.042503E-03 |
| 66 | 0.000000E+00 | -2.785701E-02 | 7.231966E-03 | -2.577842E-03 | 1.305171E-03 |
| 75 | -9.657218E+00 | -1.736113E-02 | 5.534928E-03 | -1.549958E-03 | 3.117497E-04 |
| 76 | -7.037483E+00 | -2.127625E-02 | 6.367395E-03 | -1.525825E-03 | 2.582127E-04 |
| 85 | -2.926183E-01 | -9.415512E-03 | 7.867422E-04 | -1.711164E-04 | -1.881507E-05 |
| 86 | -2.092230E+01 | 2.187274E-02 | -4.158048E-03 | 3.525351E-04 | -3.011488E-05 |
| 95 | -2.938665E-01 | -1.654140E-02 | 3.033246E-03 | -3.505562E-04 | 3.151167E-05 |
| 96 | -9.595284E+00 | -1.287942E-02 | 1.918040E-03 | -2.059451E-04 | 1.441544E-05 |
| Surface | $a_{12}$ | $a_{14}$ | $a_{16}$ | $a_{18}$ | $a_{20}$ |
| 15 | 2.464276E-05 | -4.667263E-06 | 3.692154E-07 | 0.000000E+00 | 0.000000E+00 |
| 16 | 1.768589E-04 | -2.809017E-05 | 1.994686E-06 | 0.000000E+00 | 0.000000E+00 |
| 25 | 5.349485E-04 | -8.768652E-05 | 6.563868E-06 | 0.000000E+00 | 0.000000E+00 |
| 26 | 7.105913E-04 | -1.278445E-04 | 1.180233E-05 | 0.000000E+00 | 0.000000E+00 |
| 35 | 7.626742E-04 | -1.651745E-04 | 1.610149E-05 | 0.000000E+00 | 0.000000E+00 |
| 36 | -3.650046E-05 | 3.199137E-05 | -6.043576E-06 | 0.000000E+00 | 0.000000E+00 |
| 45 | 2.965533E-03 | -1.515401E-03 | 4.602260E-04 | -7.476580E-05 | 4.854917E-06 |
| 46 | -3.345755E-03 | 1.678399E-03 | -5.130961E-04 | 8.801829E-05 | -6.594830E-06 |
| 55 | -9.286806E-03 | 4.602662E-03 | -1.396223E-03 | 2.371805E-04 | -1.740801E-05 |
| 56 | 3.677907E-04 | -8.447810E-05 | 1.257626E-05 | -1.164727E-06 | 5.429821E-08 |
| 65 | 2.228587E-04 | -3.580804E-05 | 3.909102E-06 | -2.509122E-07 | 6.902676E-09 |
| 66 | -4.396091E-04 | 8.729462E-05 | -9.883866E-06 | 5.895682E-07 | -1.440487E-08 |
| 75 | -4.682146E-05 | 4.661992E-06 | -2.780095E-07 | 8.950160E-09 | -1.199980E-10 |
| 76 | -3.161566E-05 | 2.624278E-06 | -1.353352E-07 | 3.848150E-09 | -4.561300E-11 |
| 85 | 7.733874E-06 | -8.839499E-07 | 5.082695E-08 | -1.497011E-09 | 1.791900E-11 |
| 86 | 3.175141E-06 | -2.425724E-07 | 1.073382E-08 | -2.487700E-10 | 2.347000E-12 |
| 95 | -1.964205E-06 | 7.875977E-08 | -1.925838E-09 | 2.608800E-11 | -1.500000E-13 |
| 96 | -6.560358E-07 | 1.903101E-08 | -3.326340E-10 | 3.120000E-12 | -1.200000E-14 |

FIG. 13

| Third embodiment | | | | | | |
|---|---|---|---|---|---|---|
| EFL = 7.091 mm, HFOV = 41.312°, TTL = 8.901 mm, Fno = 1.800, ImgH = 6.700 mm | | | | | | |
| Element | Surface | Radius of curvature (mm) | Gap (mm) | Refractive index | Abbe number | Focal length (mm) |
| Object | | Infinity | Infinity | | | |
| Aperture 0 | | Infinity | -0.699 | | | |
| First lens element 1 | Object-side surface 15 | 3.057 | 0.831 | 1.545 | 55.987 | 7.188 |
| | Image-side surface 16 | 12.483 | 0.078 | | | |
| Second lens element 2 | Object-side surface 25 | 10.606 | 0.318 | 1.671 | 19.243 | -27.622 |
| | Image-side surface 26 | 6.688 | 0.076 | | | |
| Third lens element 3 | Object-side surface 35 | 6.488 | 0.360 | 1.671 | 19.243 | -68.845 |
| | Image-side surface 36 | 5.568 | 0.283 | | | |
| Fourth lens element 4 | Object-side surface 45 | 10.799 | 0.601 | 1.545 | 55.987 | 34.097 |
| | Image-side surface 46 | 25.190 | 0.573 | | | |
| Fifth lens element 5 | Object-side surface 55 | -11.651 | 0.397 | 1.671 | 19.243 | -18.844 |
| | Image-side surface 56 | -135.097 | 0.080 | | | |
| Sixth lens element 6 | Object-side surface 65 | -42.400 | 0.767 | 1.545 | 55.987 | 38.236 |
| | Image-side surface 66 | -14.083 | 0.536 | | | |
| Seventh lens element 7 | Object-side surface 75 | 4.713 | 0.515 | 1.661 | 20.373 | 548.342 |
| | Image-side surface 76 | 4.566 | 0.295 | | | |
| Eighth lens element 8 | Object-side surface 85 | 4.715 | 0.468 | 1.545 | 55.987 | 7.348 |
| | Image-side surface 86 | -26.040 | 1.327 | | | |
| Ninth lens element 9 | Object-side surface 95 | -7.518 | 0.449 | 1.535 | 55.711 | -5.035 |
| | Image-side surface 96 | 4.314 | 0.503 | | | |
| Filter 11 | Object-side surface 115 | Infinity | 0.210 | 1.517 | 64.167 | |
| | Image-side surface 116 | Infinity | 0.237 | | | |
| | Image plane 99 | Infinity | | | | |

FIG. 16

| Surface | K | $a_4$ | $a_6$ | $a_8$ | $a_{10}$ |
|---|---|---|---|---|---|
| 15 | 6.293633E-02 | 2.411493E-04 | 3.429103E-04 | -3.043243E-04 | 2.510808E-04 |
| 16 | 0.000000E+00 | -2.950040E-03 | -2.961335E-03 | 4.508360E-03 | -2.615393E-03 |
| 25 | -1.968377E-01 | -8.279433E-04 | -7.562830E-03 | 7.895232E-03 | -4.490869E-03 |
| 26 | -2.994868E+00 | 7.830740E-03 | -1.207851E-02 | 8.353543E-03 | -5.334918E-03 |
| 35 | -1.613038E+00 | 8.005384E-04 | -5.685424E-03 | 4.754811E-03 | -3.786211E-03 |
| 36 | 3.942091E+00 | -1.054142E-02 | 2.402389E-03 | -1.535242E-03 | 9.723898E-04 |
| 45 | 0.000000E+00 | -8.263628E-03 | -1.166851E-03 | 1.549732E-03 | -2.846822E-03 |
| 46 | 0.000000E+00 | -4.890847E-03 | -1.775443E-03 | 5.320387E-05 | 6.819304E-04 |
| 55 | 0.000000E+00 | -1.907907E-02 | -5.626490E-03 | -2.660934E-03 | 5.560169E-03 |
| 56 | 0.000000E+00 | -8.753895E-03 | -6.237607E-03 | -1.894612E-04 | 1.132847E-03 |
| 65 | 3.474570E+01 | -5.955841E-03 | 4.051071E-03 | -5.341867E-03 | 3.110389E-03 |
| 66 | 0.000000E+00 | -2.886708E-02 | 1.045211E-02 | -5.017678E-03 | 2.077668E-03 |
| 75 | -9.641970E+00 | -1.899002E-02 | 9.477508E-03 | -3.641357E-03 | 8.322623E-04 |
| 76 | -8.314502E+00 | -3.017863E-02 | 1.348708E-02 | -4.358953E-03 | 8.802212E-04 |
| 85 | -2.359236E-01 | -1.410504E-02 | 3.883472E-03 | -1.198457E-03 | 1.724884E-04 |
| 86 | -2.900977E+01 | 2.174206E-02 | -3.863100E-03 | 2.619988E-04 | -2.379401E-05 |
| 95 | -2.074154E-01 | -1.718184E-02 | 3.169341E-03 | -3.366461E-04 | 2.567164E-05 |
| 96 | -9.827008E+00 | -1.231723E-02 | 1.801115E-03 | -1.695417E-04 | 9.652625E-06 |
| Surface | $a_{12}$ | $a_{14}$ | $a_{16}$ | $a_{18}$ | $a_{20}$ |
| 15 | -1.032662E-04 | 2.138791E-05 | -1.709513E-06 | 0.000000E+00 | 0.000000E+00 |
| 16 | 8.383059E-04 | -1.414651E-04 | 9.706221E-06 | 0.000000E+00 | 0.000000E+00 |
| 25 | 1.515533E-03 | -2.771566E-04 | 2.092210E-05 | 0.000000E+00 | 0.000000E+00 |
| 26 | 2.331382E-03 | -5.400598E-04 | 4.969844E-05 | 0.000000E+00 | 0.000000E+00 |
| 35 | 1.957370E-03 | -4.912943E-04 | 4.664073E-05 | 0.000000E+00 | 0.000000E+00 |
| 36 | -3.412367E-04 | 8.285971E-05 | -1.068014E-05 | 0.000000E+00 | 0.000000E+00 |
| 45 | 2.762358E-03 | -1.521491E-03 | 4.870659E-04 | -8.329203E-05 | 5.789630E-06 |
| 46 | -9.764213E-04 | 6.474131E-04 | -2.353893E-04 | 4.543132E-05 | -3.743499E-06 |
| 55 | -4.732227E-03 | 2.310495E-03 | -6.765381E-04 | 1.118539E-04 | -8.250144E-06 |
| 56 | -5.011521E-04 | 1.327055E-04 | -2.183024E-05 | 1.886578E-06 | -5.360663E-08 |
| 65 | -9.422083E-04 | 1.677188E-04 | -1.785310E-05 | 1.058266E-06 | -2.714888E-08 |
| 66 | -5.567829E-04 | 9.453633E-05 | -9.747752E-06 | 5.521862E-07 | -1.315876E-08 |
| 75 | -1.186965E-04 | 1.049014E-05 | -5.539123E-07 | 1.596860E-08 | -1.930550E-10 |
| 76 | -1.131758E-04 | 9.181229E-06 | -4.518731E-07 | 1.225893E-08 | -1.399170E-10 |
| 85 | -1.487628E-05 | 8.438735E-07 | -3.077199E-08 | 6.476260E-10 | -5.952000E-12 |
| 86 | 3.750273E-06 | -3.560878E-07 | 1.774701E-08 | -4.461870E-10 | 4.492000E-12 |
| 95 | -1.328513E-06 | 4.384897E-08 | -8.600100E-10 | 8.760000E-12 | -3.200000E-14 |
| 96 | -3.258427E-07 | 5.640418E-09 | -1.533200E-11 | -9.270000E-13 | 1.000000E-14 |

FIG. 17 longitudinal spherical aberration field of view field curvature (sagittal direction) HFOV (°)

field curvature (tangential direction) HFOV (°)

distortion HFOV (°)

| Fourth embodiment ||||||
|---|---|---|---|---|---|---|
| EFL = 7.115 mm, HFOV = 40.105°, TTL = 9.111 mm, Fno = 1.800, ImgH = 6.700 mm |||||||
| Element | Surface | Radius of curvature (mm) | Gap (mm) | Refractive index | Abbe number | Focal length (mm) |
| Object | | Infinity | Infinity | | | |
| Aperture 0 | | Infinity | -0.720 | | | |
| First lens element 1 | Object-side surface 15 | 3.106 | 1.059 | 1.545 | 55.987 | 6.318 |
| | Image-side surface 16 | 27.350 | 0.050 | | | |
| Second lens element 2 | Object-side surface 25 | 18.905 | 0.206 | 1.640 | 23.529 | -23.535 |
| | Image-side surface 26 | 8.381 | 0.058 | | | |
| Third lens element 3 | Object-side surface 35 | 8.087 | 0.360 | 1.640 | 23.529 | -30.257 |
| | Image-side surface 36 | 5.617 | 0.273 | | | |
| Fourth lens element 4 | Object-side surface 45 | 11.248 | 0.645 | 1.545 | 55.987 | 29.667 |
| | Image-side surface 46 | 36.017 | 0.593 | | | |
| Fifth lens element 5 | Object-side surface 55 | -11.022 | 0.382 | 1.640 | 23.529 | -17.570 |
| | Image-side surface 56 | -416.331 | 0.053 | | | |
| Sixth lens element 6 | Object-side surface 65 | -71.303 | 0.800 | 1.545 | 55.987 | 29.628 |
| | Image-side surface 66 | -13.243 | 0.508 | | | |
| Seventh lens element 7 | Object-side surface 75 | 4.968 | 0.436 | 1.640 | 23.529 | -148.443 |
| | Image-side surface 76 | 4.560 | 0.277 | | | |
| Eighth lens element 8 | Object-side surface 85 | 4.750 | 0.838 | 1.545 | 55.987 | 7.416 |
| | Image-side surface 86 | -25.808 | 1.137 | | | |
| Ninth lens element 9 | Object-side surface 95 | -8.044 | 0.587 | 1.535 | 55.711 | -4.969 |
| | Image-side surface 96 | 4.098 | 0.503 | | | |
| Filter 11 | Object-side surface 115 | Infinity | 0.210 | 1.517 | 64.167 | |
| | Image-side surface 116 | Infinity | 0.138 | | | |
| | Image plane 99 | Infinity | | | | |

FIG. 20

| Surface | K | $a_4$ | $a_6$ | $a_8$ | $a_{10}$ |
|---|---|---|---|---|---|
| 15 | 5.727633E-02 | 4.898572E-04 | 3.213459E-04 | -2.508971E-04 | 1.841785E-04 |
| 16 | 0.000000E+00 | -3.903967E-03 | -2.528782E-03 | 5.317131E-03 | -3.404660E-03 |
| 25 | 2.586983E+00 | -2.315299E-03 | -7.288009E-03 | 8.339606E-03 | -4.863224E-03 |
| 26 | -2.902198E+00 | 5.749792E-03 | -4.935223E-03 | -4.106913E-05 | -9.429991E-04 |
| 35 | -2.187847E+00 | -2.637911E-03 | 3.661747E-03 | -5.116310E-03 | 1.142555E-03 |
| 36 | 4.008555E+00 | -1.212933E-02 | 4.858246E-03 | -3.683779E-03 | 1.993805E-03 |
| 45 | 0.000000E+00 | -6.960000E-03 | -7.762419E-04 | 3.348547E-04 | -1.233351E-03 |
| 46 | 0.000000E+00 | -4.525589E-03 | -7.235705E-04 | -2.412371E-03 | 3.313028E-03 |
| 55 | 0.000000E+00 | -1.762051E-02 | -9.045526E-03 | 2.729315E-03 | -1.960255E-04 |
| 56 | 0.000000E+00 | -4.090505E-03 | -1.526184E-02 | 7.787014E-03 | -2.804904E-03 |
| 65 | 0.000000E+00 | -1.291035E-03 | -6.325886E-03 | 3.389372E-03 | -7.587476E-04 |
| 66 | 0.000000E+00 | -2.657688E-02 | 8.794972E-03 | -4.170591E-03 | 1.814375E-03 |
| 75 | -1.392870E+01 | -1.995810E-02 | 1.010451E-02 | -4.213780E-03 | 1.100089E-03 |
| 76 | -8.482825E+00 | -3.066532E-02 | 1.367919E-02 | -4.853790E-03 | 1.108545E-03 |
| 85 | -2.851028E-01 | -1.228433E-02 | 2.736729E-03 | -9.195043E-04 | 1.439932E-04 |
| 86 | 0.000000E+00 | 1.975345E-02 | -3.434764E-03 | 2.189592E-04 | 2.414596E-06 |
| 95 | -4.131514E-01 | -1.513882E-02 | 2.238842E-03 | -1.625962E-04 | 8.059036E-06 |
| 96 | -7.868862E+00 | -1.216673E-02 | 1.709223E-03 | -1.590643E-04 | 9.586327E-06 |
| Surface | $a_{12}$ | $a_{14}$ | $a_{16}$ | $a_{18}$ | $a_{20}$ |
| 15 | -7.025129E-05 | 1.378918E-05 | -1.114959E-06 | 0.000000E+00 | 0.000000E+00 |
| 16 | 1.159570E-03 | -2.095796E-04 | 1.568569E-05 | 0.000000E+00 | 0.000000E+00 |
| 25 | 1.693126E-03 | -3.246451E-04 | 2.602871E-05 | 0.000000E+00 | 0.000000E+00 |
| 26 | 1.258363E-03 | -4.350791E-04 | 4.843308E-05 | 0.000000E+00 | 0.000000E+00 |
| 35 | 7.499164E-04 | -3.656028E-04 | 4.408366E-05 | 0.000000E+00 | 0.000000E+00 |
| 36 | -5.881462E-04 | 1.060504E-04 | -1.004147E-05 | 0.000000E+00 | 0.000000E+00 |
| 45 | 1.365964E-03 | -7.544939E-04 | 2.351371E-04 | -3.831872E-05 | 2.427649E-06 |
| 46 | -2.736918E-03 | 1.383779E-03 | -4.205827E-04 | 7.073696E-05 | -5.169890E-06 |
| 55 | -8.930372E-04 | 6.737482E-04 | -2.356399E-04 | 4.321948E-05 | -3.529764E-06 |
| 56 | 6.963458E-04 | -8.980831E-05 | 1.190206E-06 | 9.282834E-07 | -6.453899E-08 |
| 65 | 8.868911E-05 | -5.702948E-06 | 3.712038E-07 | -4.096065E-08 | 2.044123E-09 |
| 66 | -5.003661E-04 | 8.447205E-05 | -8.392577E-06 | 4.463949E-07 | -9.759219E-09 |
| 75 | -1.812164E-04 | 1.855576E-05 | -1.139597E-06 | 3.838500E-08 | -5.449760E-10 |
| 76 | -1.610043E-04 | 1.462527E-05 | -7.995435E-07 | 2.393199E-08 | -2.995120E-10 |
| 85 | -1.152584E-05 | 3.155156E-07 | 1.564616E-08 | -1.233803E-09 | 2.257500E-11 |
| 86 | -1.587307E-06 | 1.309884E-07 | -5.311819E-09 | 1.097410E-10 | -9.210000E-13 |
| 95 | -2.546268E-07 | 3.328084E-09 | 5.945200E-11 | -2.605000E-12 | 2.500000E-14 |
| 96 | -3.791211E-07 | 9.783280E-09 | -1.586030E-10 | 1.477000E-12 | -6.000000E-15 |

FIG. 21

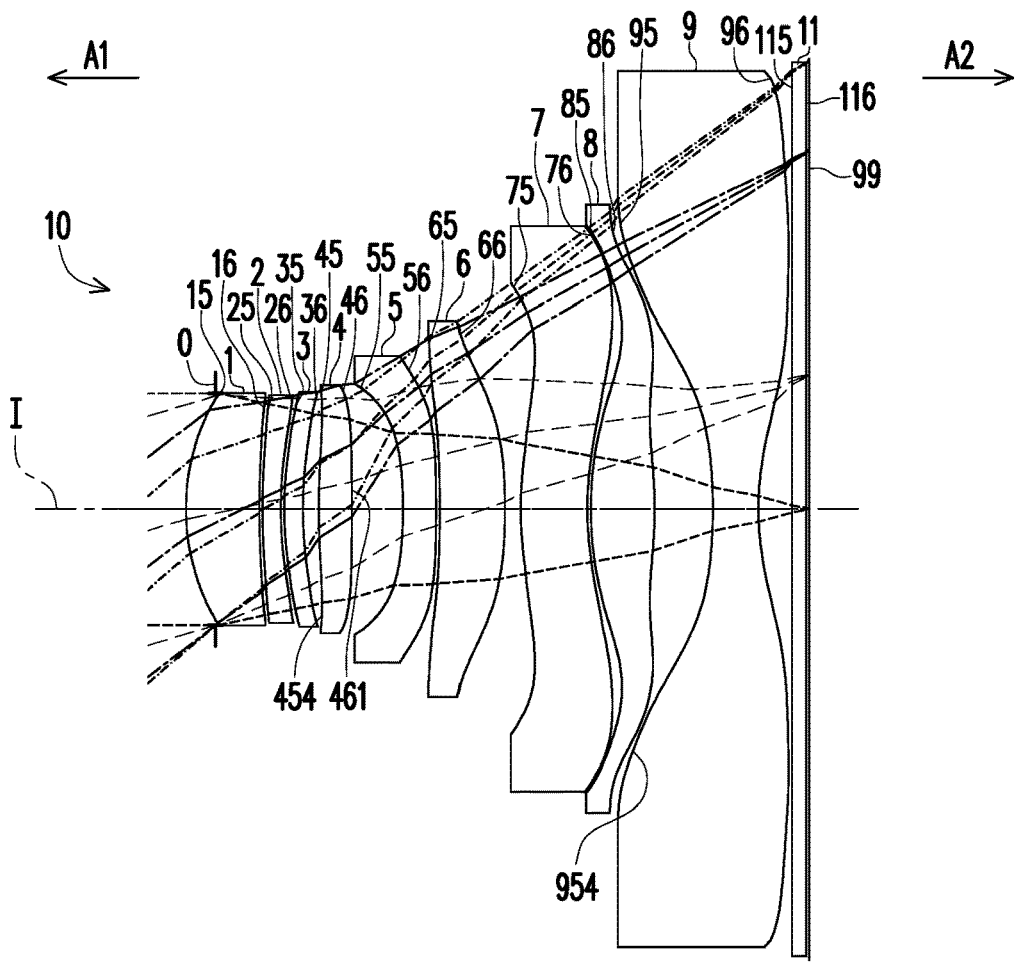
FIG. 22
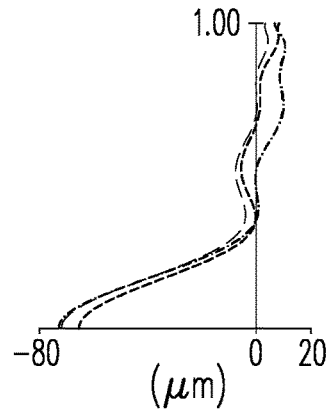 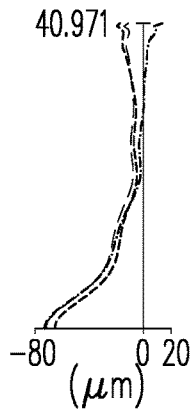 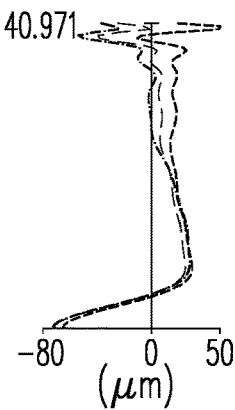 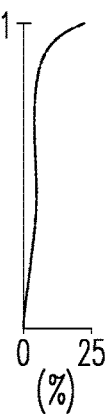
FIG. 23A   FIG. 23B   FIG. 23C   FIG. 23D

| Fifth embodiment |||||||
|---|---|---|---|---|---|---|
| EFL = 6.206 mm, HFOV = 40.971°, TTL = 9.280 mm, Fno = 1.800, ImgH = 6.700 mm |||||||
| Element | Surface | Radius of curvature (mm) | Gap (mm) | Refractive index | Abbe number | Focal length (mm) |
| Object | | Infinity | Infinity | | | |
| Aperture 0 | | Infinity | -0.443 | | | |
| First lens element 1 | Object-side surface 15 | 3.362 | 1.094 | 1.545 | 55.987 | 7.720 |
| | Image-side surface 16 | 14.663 | 0.050 | | | |
| Second lens element 2 | Object-side surface 25 | 11.190 | 0.273 | 1.671 | 19.243 | -24.159 |
| | Image-side surface 26 | 6.581 | 0.050 | | | |
| Third lens element 3 | Object-side surface 35 | 6.126 | 0.279 | 1.671 | 19.243 | 628.983 |
| | Image-side surface 36 | 6.102 | 0.237 | | | |
| Fourth lens element 4 | Object-side surface 45 | 11.688 | 0.490 | 1.545 | 55.987 | 19.918 |
| | Image-side surface 46 | -155.262 | 0.763 | | | |
| Fifth lens element 5 | Object-side surface 55 | -7.619 | 0.495 | 1.671 | 19.243 | -14.363 |
| | Image-side surface 56 | -36.029 | 0.054 | | | |
| Sixth lens element 6 | Object-side surface 65 | -20.671 | 0.963 | 1.545 | 55.987 | 36.249 |
| | Image-side surface 66 | -10.280 | 0.238 | | | |
| Seventh lens element 7 | Object-side surface 75 | 5.417 | 0.990 | 1.661 | 20.373 | -50.283 |
| | Image-side surface 76 | 4.323 | 0.053 | | | |
| Eighth lens element 8 | Object-side surface 85 | 4.796 | 0.953 | 1.545 | 55.987 | 5.038 |
| | Image-side surface 86 | -6.005 | 0.870 | | | |
| Ninth lens element 9 | Object-side surface 95 | -8.351 | 0.668 | 1.535 | 55.711 | -5.117 |
| | Image-side surface 96 | 4.213 | 0.503 | | | |
| Filter 11 | Object-side surface 115 | Infinity | 0.210 | 1.517 | 64.167 | |
| | Image-side surface 116 | Infinity | 0.050 | | | |
| | Image plane 99 | Infinity | | | | |

FIG. 24

| Surface | K | $a_4$ | $a_6$ | $a_8$ | $a_{10}$ |
|---|---|---|---|---|---|
| 15 | 7.771317E-02 | -3.642624E-04 | 2.592809E-03 | -2.940070E-03 | 1.946027E-03 |
| 16 | 0.000000E+00 | -3.315209E-03 | -4.795098E-03 | 9.112428E-03 | -6.544824E-03 |
| 25 | -4.333848E+00 | -3.952338E-03 | -5.154053E-03 | 5.145416E-03 | -2.324374E-03 |
| 26 | -3.012218E+00 | 7.879230E-03 | -6.387541E-03 | -3.731711E-03 | 5.307673E-03 |
| 35 | -1.808057E+00 | 9.513462E-04 | -2.656874E-03 | -2.388718E-03 | 2.878659E-03 |
| 36 | 3.626885E+00 | -1.089911E-02 | -2.398624E-03 | 3.840358E-03 | -2.197311E-03 |
| 45 | 0.000000E+00 | -8.708639E-03 | 9.988656E-03 | -2.465862E-02 | 2.751345E-02 |
| 46 | 0.000000E+00 | -6.192951E-04 | -1.238570E-02 | 1.891179E-02 | -2.215328E-02 |
| 55 | 0.000000E+00 | -3.206110E-02 | 2.695509E-02 | -4.842385E-02 | 4.479913E-02 |
| 56 | 0.000000E+00 | -1.619181E-02 | 3.994554E-03 | -8.825154E-03 | 6.285685E-03 |
| 65 | 0.000000E+00 | 1.731019E-03 | -7.211180E-03 | 3.317503E-03 | -5.695776E-04 |
| 66 | 0.000000E+00 | -2.192321E-02 | -1.879333E-03 | 4.555198E-03 | -2.432624E-03 |
| 75 | -7.848703E+00 | -1.648660E-02 | 4.501662E-03 | -4.791319E-04 | -1.205124E-04 |
| 76 | -4.532598E+00 | -2.267819E-02 | 9.286500E-03 | -2.291607E-03 | 3.232161E-04 |
| 85 | -2.122093E-01 | -1.506973E-02 | 8.755114E-03 | -2.550675E-03 | 3.363859E-04 |
| 86 | -8.823272E+01 | -7.201829E-03 | 1.469390E-02 | -5.112240E-03 | 8.591353E-04 |
| 95 | 1.841778E-01 | -8.379355E-03 | -2.243253E-03 | 7.236303E-04 | -7.101813E-05 |
| 96 | -4.157913E+00 | 4.675561E-05 | -2.413502E-03 | 4.111477E-04 | -3.356417E-05 |
| Surface | $a_{12}$ | $a_{14}$ | $a_{16}$ | $a_{18}$ | $a_{20}$ |
| 15 | -7.210039E-04 | 1.412436E-04 | -1.140145E-05 | 0.000000E+00 | 0.000000E+00 |
| 16 | 2.618159E-03 | -5.560871E-04 | 4.860842E-05 | 0.000000E+00 | 0.000000E+00 |
| 25 | 6.453266E-04 | -1.176519E-04 | 1.192561E-05 | 0.000000E+00 | 0.000000E+00 |
| 26 | -2.358573E-03 | 4.391602E-04 | -2.330681E-05 | 0.000000E+00 | 0.000000E+00 |
| 35 | -1.034537E-03 | 1.398670E-04 | -2.233105E-06 | 0.000000E+00 | 0.000000E+00 |
| 36 | 7.208854E-04 | -8.278562E-05 | -3.348707E-06 | 0.000000E+00 | 0.000000E+00 |
| 45 | -1.836700E-02 | 7.638895E-03 | -1.945266E-03 | 2.824176E-04 | -1.839173E-05 |
| 46 | 1.592316E-02 | -7.063657E-03 | 1.884454E-03 | -2.767332E-04 | 1.703204E-05 |
| 55 | -2.638570E-02 | 9.863310E-03 | -2.271863E-03 | 2.974571E-04 | -1.723965E-05 |
| 56 | -2.518686E-03 | 6.182980E-04 | -9.075298E-05 | 7.285232E-06 | -2.448788E-07 |
| 65 | 7.287818E-06 | 1.326569E-05 | -2.298200E-06 | 1.744482E-07 | -5.597680E-09 |
| 66 | 7.645697E-04 | -1.461672E-04 | 1.660321E-05 | -1.026848E-06 | 2.651953E-08 |
| 75 | 4.521518E-05 | -6.327727E-06 | 4.475550E-07 | -1.516922E-08 | 1.790920E-10 |
| 76 | -2.691759E-05 | 1.289332E-06 | -3.116376E-08 | 1.949040E-10 | 3.517000E-12 |
| 85 | -2.214203E-05 | 5.588283E-07 | 1.340553E-08 | -1.100256E-09 | 1.821900E-11 |
| 86 | -8.481947E-05 | 5.156740E-06 | -1.896002E-07 | 3.864550E-09 | -3.352200E-11 |
| 95 | 2.801260E-06 | 7.379613E-09 | -4.368971E-09 | 1.369410E-10 | -1.397000E-12 |
| 96 | 1.590199E-06 | -4.582094E-08 | 7.908030E-10 | -7.501000E-12 | 3.000000E-14 |

FIG. 25

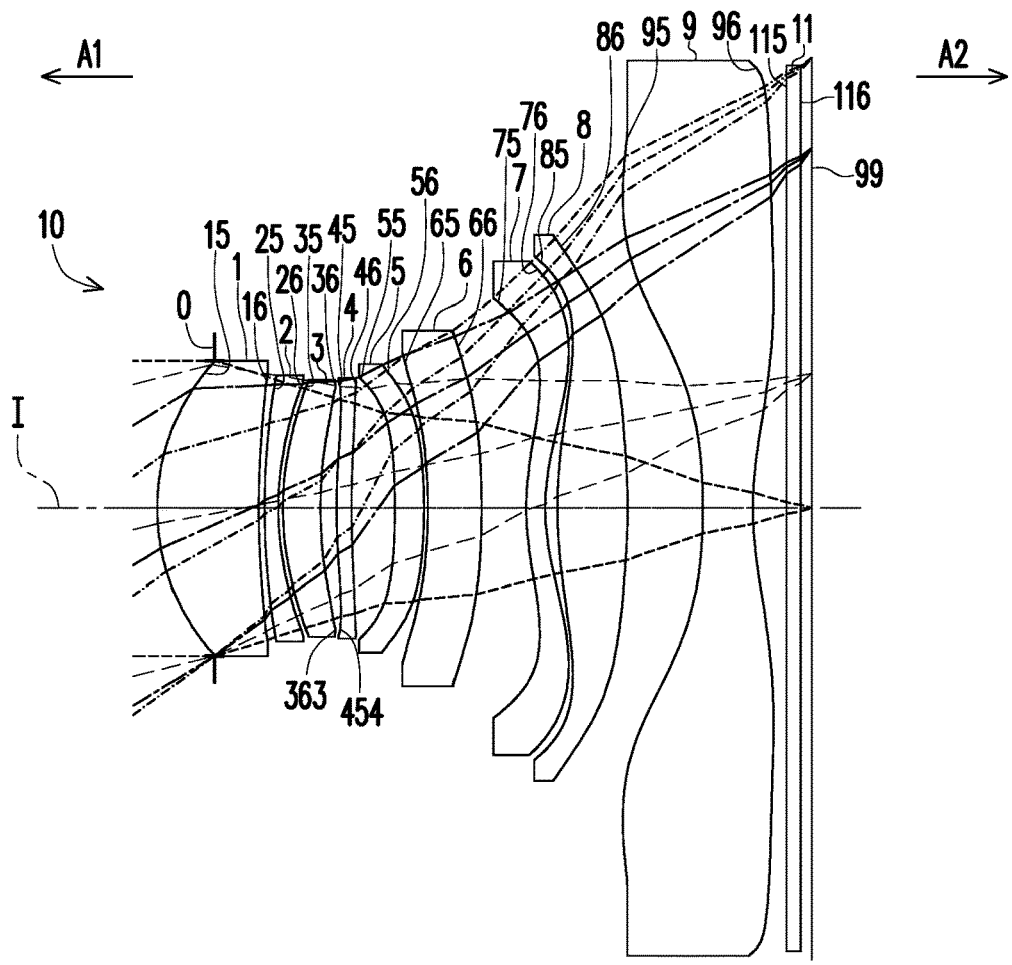
FIG. 26
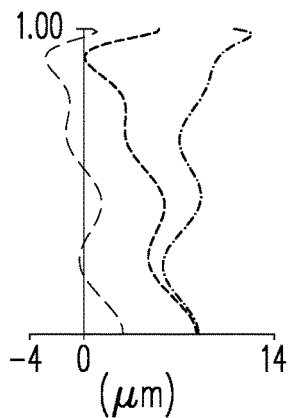
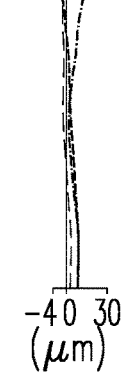
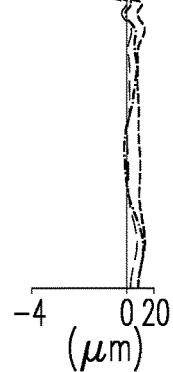
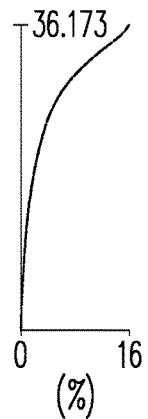
FIG. 27A  FIG. 27B  FIG. 27C  FIG. 27D

| Sixth embodiment | | | | | | |
|---|---|---|---|---|---|---|
| EFL = 7.905 mm, HFOV = 36.173°, TTL = 9.723 mm, Fno = 1.800, ImgH = 6.700 mm | | | | | | |
| Element | Surface | Radius of curvature (mm) | Gap (mm) | Refractive index | Abbe number | Focal length (mm) |
| Object | | Infinity | Infinity | | | |
| Aperture 0 | | Infinity | -0.843 | | | |
| First lens element 1 | Object-side surface 15 | 3.294 | 1.505 | 1.545 | 55.987 | 7.516 |
| | Image-side surface 16 | 13.970 | 0.084 | | | |
| Second lens element 2 | Object-side surface 25 | 9.049 | 0.206 | 1.671 | 19.243 | -12.738 |
| | Image-side surface 26 | 4.377 | 0.068 | | | |
| Third lens element 3 | Object-side surface 35 | 4.309 | 0.559 | 1.545 | 55.987 | 25.203 |
| | Image-side surface 36 | 5.984 | 0.241 | | | |
| Fourth lens element 4 | Object-side surface 45 | 10.208 | 0.223 | 1.671 | 19.243 | 52.320 |
| | Image-side surface 46 | 14.211 | 0.642 | | | |
| Fifth lens element 5 | Object-side surface 55 | -14.070 | 0.436 | 1.545 | 55.987 | 53.397 |
| | Image-side surface 56 | -9.595 | 0.059 | | | |
| Sixth lens element 6 | Object-side surface 65 | -8.390 | 0.788 | 1.661 | 20.373 | -28.430 |
| | Image-side surface 66 | -15.612 | 0.666 | | | |
| Seventh lens element 7 | Object-side surface 75 | 3.631 | 0.282 | 1.567 | 37.490 | -31.434 |
| | Image-side surface 76 | 2.934 | 0.185 | | | |
| Eighth lens element 8 | Object-side surface 85 | 6.594 | 1.047 | 1.545 | 55.987 | 7.344 |
| | Image-side surface 86 | -9.670 | 1.120 | | | |
| Ninth lens element 9 | Object-side surface 95 | -9.345 | 0.734 | 1.535 | 55.711 | -5.676 |
| | Image-side surface 96 | 4.651 | 0.503 | | | |
| Filter 11 | Object-side surface 115 | Infinity | 0.210 | 1.517 | 64.167 | |
| | Image-side surface 116 | Infinity | 0.165 | | | |
| | Image plane 99 | Infinity | | | | |

FIG. 28

| Surface | K | $a_4$ | $a_6$ | $a_8$ | $a_{10}$ |
|---|---|---|---|---|---|
| 15 | 2.110943E-02 | 3.372518E-04 | 9.272494E-06 | 2.996962E-05 | -1.412088E-05 |
| 16 | 0.000000E+00 | -1.645004E-03 | -1.588508E-03 | 1.126240E-03 | -1.332703E-04 |
| 25 | -1.510052E+00 | -5.798444E-03 | -3.323470E-03 | 3.859449E-03 | -1.432572E-03 |
| 26 | -1.820271E+00 | -3.434199E-03 | -4.189625E-03 | 4.631539E-03 | -1.758433E-03 |
| 35 | -1.546547E+00 | -1.433433E-03 | -2.912701E-03 | 2.320440E-03 | -7.973560E-04 |
| 36 | 1.845585E+00 | -4.053820E-03 | -1.408909E-04 | -8.094071E-04 | 8.339060E-04 |
| 45 | 0.000000E+00 | -6.549522E-03 | -2.533439E-03 | 1.925083E-03 | -1.682285E-03 |
| 46 | 0.000000E+00 | -5.651179E-03 | -5.600855E-04 | -1.275983E-03 | 2.002751E-03 |
| 55 | 0.000000E+00 | -1.492997E-02 | -8.842584E-04 | -5.567095E-03 | 5.677283E-03 |
| 56 | 0.000000E+00 | -1.561144E-02 | 1.080647E-02 | -1.692266E-02 | 1.080102E-02 |
| 65 | 0.000000E+00 | -1.002362E-02 | 1.226646E-02 | -1.253432E-02 | 6.930831E-03 |
| 66 | 0.000000E+00 | -1.252370E-02 | 4.143568E-03 | -1.776431E-03 | 6.648180E-04 |
| 75 | -1.198052E+01 | -1.210316E-02 | 2.012789E-03 | -2.171751E-04 | -2.037758E-04 |
| 76 | -6.090166E+00 | -2.047486E-02 | 7.529358E-03 | -2.225369E-03 | 3.994862E-04 |
| 85 | -1.003859E+00 | -9.137522E-03 | 1.482020E-03 | -3.368950E-04 | 4.340344E-05 |
| 86 | 2.729800E+00 | 8.408647E-03 | -1.055948E-03 | -1.891668E-04 | 7.235601E-05 |
| 95 | -2.035991E-01 | -1.307560E-02 | 2.493623E-03 | -3.963172E-04 | 4.790784E-05 |
| 96 | -8.540113E+00 | -1.064933E-02 | 1.612271E-03 | -1.774046E-04 | 1.318898E-05 |
| Surface | $a_{12}$ | $a_{14}$ | $a_{16}$ | $a_{18}$ | $a_{20}$ |
| 15 | 4.580985E-06 | -8.156492E-07 | 6.180914E-08 | 0.000000E+00 | 0.000000E+00 |
| 16 | -8.582382E-05 | 3.141022E-05 | -2.982762E-06 | 0.000000E+00 | 0.000000E+00 |
| 25 | 2.201146E-04 | -8.279568E-07 | -2.118061E-06 | 0.000000E+00 | 0.000000E+00 |
| 26 | 2.074694E-04 | 3.912447E-05 | -9.048029E-06 | 0.000000E+00 | 0.000000E+00 |
| 35 | 2.090224E-05 | 5.465145E-05 | -8.963022E-06 | 0.000000E+00 | 0.000000E+00 |
| 36 | -5.403127E-04 | 1.646252E-04 | -1.885382E-05 | 0.000000E+00 | 0.000000E+00 |
| 45 | 1.258890E-03 | -6.493205E-04 | 2.009332E-04 | -3.272088E-05 | 2.040349E-06 |
| 46 | -1.225794E-03 | 4.124610E-04 | -7.057778E-05 | 4.116260E-06 | 1.238840E-07 |
| 55 | -3.501769E-03 | 1.360145E-03 | -3.181068E-04 | 4.023474E-05 | -2.077458E-06 |
| 56 | -4.213177E-03 | 1.100518E-03 | -1.887223E-04 | 1.909021E-05 | -8.462432E-07 |
| 65 | -2.262634E-03 | 4.568838E-04 | -5.583228E-05 | 3.762848E-06 | -1.069205E-07 |
| 66 | -1.771546E-04 | 3.015700E-05 | -3.016213E-06 | 1.605156E-07 | -3.510552E-09 |
| 75 | 8.415628E-05 | -1.519980E-05 | 1.465547E-06 | -7.282444E-08 | 1.463825E-09 |
| 76 | -4.575906E-05 | 3.375055E-06 | -1.553127E-07 | 4.039234E-09 | -4.487000E-11 |
| 85 | -3.093931E-06 | 8.955045E-08 | 1.191663E-09 | -1.220300E-10 | 1.874000E-12 |
| 86 | -1.039084E-05 | 8.169817E-07 | -3.614770E-08 | 8.393570E-10 | -7.952000E-12 |
| 95 | -3.590603E-06 | 1.624844E-07 | -4.358137E-09 | 6.403100E-11 | -3.980000E-13 |
| 96 | -6.345737E-07 | 1.945226E-08 | -3.675360E-10 | 3.910000E-12 | -1.800000E-14 |

FIG. 29

| Conditional expression | First embodiment | Second embodiment | Third embodiment | Fourth embodiment | Fifth embodiment | Sixth embodiment |
|---|---|---|---|---|---|---|
| T9/T8 | 0.701 | 0.821 | 0.958 | 0.701 | 0.701 | 0.701 |
| D32t51/D12t31 | 1.603 | 2.013 | 3.090 | 4.805 | 3.991 | 3.091 |
| D61t71/D12t31 | 1.977 | 1.304 | 2.763 | 4.162 | 3.218 | 4.062 |
| V5+V6+V7 | 95.603 | 95.603 | 95.603 | 103.045 | 95.603 | 113.849 |
| TTL/(G34+G45+G67) | 7.265 | 7.499 | 6.396 | 6.631 | 7.499 | 6.275 |
| (AAG+BFL)/(T4+T6) | 3.412 | 3.453 | 3.067 | 2.630 | 2.118 | 3.899 |
| (T4+G45+T5)/(G12+T2) | 3.101 | 3.101 | 3.968 | 6.313 | 5.407 | 4.488 |
| TL/(T8+G89+T9) | 3.493 | 3.518 | 3.544 | 3.225 | 3.420 | 3.050 |
| EFL/(T3+T5+G56) | 7.501 | 7.805 | 8.479 | 8.954 | 7.503 | 7.499 |
| V2+V3+V4 | 94.473 | 94.473 | 94.473 | 103.045 | 94.473 | 94.473 |
| TTL/(T1+BFL) | 4.665 | 4.999 | 4.999 | 4.772 | 4.999 | 4.081 |
| AAG/(T4+G67) | 3.599 | 3.599 | 2.855 | 2.558 | 3.181 | 3.447 |
| (T5+G56+T6)/(T2+G23) | 2.401 | 2.401 | 3.156 | 4.670 | 4.680 | 4.675 |
| ALT/EFL | 0.710 | 0.717 | 0.664 | 0.747 | 1.000 | 0.731 |
| EFL/(T3+G78) | 12.125 | 11.378 | 10.832 | 11.169 | 18.739 | 10.627 |
| V2+V5+V8 | 94.473 | 94.473 | 94.473 | 103.045 | 94.473 | 131.217 |
| TL/(EFL+BFL) | 0.991 | 1.004 | 0.989 | 1.037 | 1.222 | 1.007 |
| AAG/(T1+T8) | 1.772 | 1.863 | 2.498 | 1.555 | 1.131 | 1.201 |
| (T6+G67+T7)/(T4+G56) | 4.268 | 2.501 | 2.669 | 2.501 | 4.031 | 6.144 |
| ALT/(G45+G89) | 3.068 | 3.087 | 2.476 | 3.072 | 3.799 | 3.280 |

FIG. 30

OPTICAL IMAGING LENS COMPRISING NINE LENS ELEMENTS

CROSS-REFERENCE TO RELATED APPLICATION

This application claims the priority benefit of China application serial no. 202210033186.5, filed on Jan. 12, 2022. The entirety of the above-mentioned patent application is hereby incorporated by reference herein and made a part of this specification.

BACKGROUND

Technical Field

The disclosure relates to an optical element, and in particular to an optical imaging lens.

Description of Related Art

The specifications of a portable electronic device are changing quickly, and a key component thereof, an optical imaging lens, has also developed to be more diversified. In addition to the requirement for slim, thin, and short lens, the design of a small f-number (Fno) helps to increase luminous flux, and a large field of view has gradually become a trend. Moreover, in order to improve pixel and resolution, the image height of the lens has been increased, and a larger image sensor is adopted to receive the imaging rays to meet the demand for high pixel. Therefore, how to design an optical imaging lens that is light, thin, short, and small, has a small Fno, a large image height, and good image quality has become an issue to be solved.

SUMMARY

The disclosure provides an optical imaging lens that may have a small f-number (Fno), a greater image height, a small volume, and good imaging quality. This optical imaging lens may be used for photographing images and recording videos, and may be applied to a portable electronic product such as a mobile phone, a camera, a tablet computer, a personal digital assistant (PDA), or a head-mounted display (e.g., an augmented reality (AR), virtual reality (VR), or mixed reality (MR) display).

An embodiment of the disclosure provides an optical imaging lens including a first lens element, a second lens element, a third lens element, a fourth lens element, a fifth lens element, a sixth lens element, a seventh lens element, an eighth lens element, and a ninth lens element sequentially arranged along an optical axis from an object side to an image side. Each of the first lens element to the ninth lens element includes an object-side surface facing the object side and allowing imaging rays to pass through and an image-side surface facing the image side and allowing the imaging rays to pass through. The first lens element has positive refracting power, while the second lens element has negative refracting power. An optical axis region of the image-side surface of the fifth lens element is convex, while an optical axis region of the image-side surface of the seventh lens element is concave. The eighth lens element has positive refracting power or the ninth lens element has negative refracting power. Lens elements of the optical imaging lens are only the nine lens elements described above, and the optical imaging lens satisfies the following conditional expressions: $T9/T8 \geq 0.700$ and $D32t51/D12t31 \geq 1.600$. T9 is a thickness of the ninth lens element on the optical axis; T8 is a thickness of the eighth lens element on the optical axis; D32t51 is a distance from the image-side surface of the third lens element to the object-side surface of the fifth lens element on the optical axis, and D12t31 is a distance from the image-side surface of the first lens element to the object-side surface of the third lens element on the optical axis.

An embodiment of the disclosure provides an optical imaging lens including a first lens element, a second lens element, a third lens element, a fourth lens element, a fifth lens element, a sixth lens element, a seventh lens element, an eighth lens element, and a ninth lens element sequentially arranged along an optical axis from an object side to an image side. Each of the first lens element to the ninth lens element includes an object-side surface facing the object side and allowing imaging rays to pass through and an image-side surface facing the image side and allowing the imaging rays to pass through. The first lens element has positive refracting power, while the second lens element has negative refracting power. An optical axis region of the image-side surface of the fifth lens element is convex, an optical axis region of the object-side surface of the seventh lens element is convex, and an optical axis region of the object-side surface of the eighth lens element is convex. The fourth lens element has positive refracting power or the eighth lens element has positive refracting power. Lens elements of the optical imaging lens are only the nine lens elements described above, and the optical imaging lens satisfies the following conditional expressions: $T9/T8 \geq 0.700$ and $D32t51/D12t31 \geq 1.600$. T9 is a thickness of the ninth lens element on the optical axis; T8 is a thickness of the eighth lens element on the optical axis; D32t51 is a distance from the image-side surface of the third lens element to the object-side surface of the fifth lens element on the optical axis, and D12t31 is a distance from the image-side surface of the first lens element to the object-side surface of the third lens element on the optical axis.

An embodiment of the disclosure provides an optical imaging lens including a first lens element, a second lens element, a third lens element, a fourth lens element, a fifth lens element, a sixth lens element, a seventh lens element, an eighth lens element, and a ninth lens element sequentially arranged along an optical axis from an object side to an image side. Each of the first lens element to the ninth lens element includes an object-side surface facing the object side and allowing imaging rays to pass through and an image-side surface facing the image side and allowing the imaging rays to pass through. The second lens element has negative refracting power, while the fourth lens element has positive refracting power. An optical axis region of the image-side surface of the fifth lens element is convex, while an optical axis region of the image-side surface of the seventh lens element is concave. Lens elements of the optical imaging lens are only the nine lens elements described above, and the optical imaging lens satisfies the following conditional expressions: $T9/T8 \geq 0.700$ and $D61t71/D12t31 \geq 1.300$. T9 is a thickness of the ninth lens element on the optical axis; T8 is a thickness of the eighth lens element on the optical axis; D61t71 is a distance from the object-side surface of the sixth lens element to the object-side surface of the seventh lens element on the optical axis, and D12t31 is a distance from the image-side surface of the first lens element to the object-side surface of the third lens element on the optical axis.

Based on the above, the optical imaging lens of the embodiments of the disclosure has the beneficial effects that the optical imaging lens of the embodiments of the invention satisfies the quantity of the above lens elements and the surface shapes of the above lens elements, and satisfies the above conditional expressions, so that the optical imaging lens may provide a lens with a small Fno, a greater image height, a small volume, and good imaging quality.

In order to make the aforementioned features and advantages of the disclosure comprehensible, embodiments accompanied with drawings are described in detail below.

BRIEF DESCRIPTION OF THE DRAWINGS

FIG. 6 is a schematic diagram of an optical imaging lens of the first embodiment of the disclosure.

FIG. 7A to FIG. 7D are diagrams of longitudinal spherical aberrations and various aberrations of the optical imaging lens of the first embodiment.

FIG. 8 illustrates detailed optical data of the optical imaging lens of the first embodiment of the disclosure.

FIG. 9 illustrates aspheric parameters of the optical imaging lens of the first embodiment of the disclosure.

FIG. 10 is a schematic diagram of an optical imaging lens of the second embodiment of the disclosure.

FIG. 11A to FIG. 11D are diagrams of longitudinal spherical aberrations and various aberrations of the optical imaging lens of the second embodiment.

FIG. 12 illustrates detailed optical data of the optical imaging lens of the second embodiment of the disclosure.

FIG. 13 illustrates aspheric parameters of the optical imaging lens of the second embodiment of the disclosure.

FIG. 16 illustrates detailed optical data of the optical imaging lens of the third embodiment of the disclosure.

FIG. 17 illustrates aspheric parameters of the optical imaging lens of the third embodiment of the disclosure.

FIG. 20 illustrates detailed optical data of the optical imaging lens of the fourth embodiment of the disclosure.

FIG. 21 illustrates aspheric parameters of the optical imaging lens of the fourth embodiment of the disclosure.

FIG. 22 is a schematic diagram of an optical imaging lens of the fifth embodiment of the disclosure.

FIG. 23A to FIG. 23D are diagrams of longitudinal spherical aberrations and various aberrations of the optical imaging lens of the fifth embodiment.

FIG. 24 illustrates detailed optical data of the optical imaging lens of the fifth embodiment of the disclosure.

FIG. 25 illustrates aspheric parameters of the optical imaging lens of the fifth embodiment of the disclosure.

FIG. 26 is a schematic diagram of an optical imaging lens of the sixth embodiment of the disclosure.

FIG. 27A to FIG. 27D are diagrams of longitudinal spherical aberrations and various aberrations of the optical imaging lens of the sixth embodiment.

FIG. 28 illustrates detailed optical data of the optical imaging lens of the sixth embodiment of the disclosure.

FIG. 29 illustrates aspheric parameters of the optical imaging lens of the sixth embodiment of the disclosure.

FIG. 30 illustrates numerical values of conditional expressions of all important parameters of the optical imaging lenses according to the first through the sixth embodiments of the disclosure.

DESCRIPTION OF THE EMBODIMENTS

The terms "optical axis region", "periphery region", "concave", and "convex" used in this specification and claims should be interpreted based on the definition listed in the specification by the principle of lexicographer.

Figure 1:
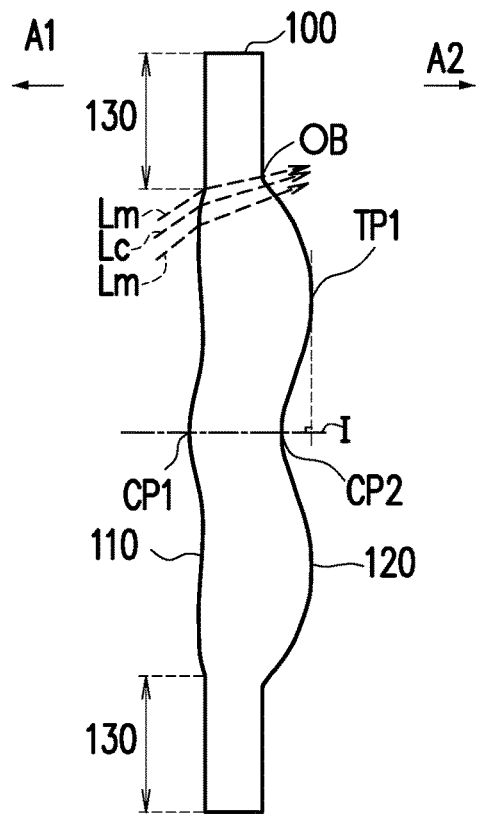
FIG. 1 is a schematic diagram illustrating a surface shape structure of a lens element.

In the present disclosure, the optical system may comprise at least one lens element to receive imaging rays that are incident on the optical system over a set of angles ranging from parallel to an optical axis to a half field of view (HFOV) angle with respect to the optical axis. The imaging rays pass through the optical system to produce an image on an image plane. The term "a lens element having positive refracting power (or negative refracting power)" means that the paraxial refracting power of the lens element in Gaussian optics is positive (or negative). The term "an object-side (or image-side) surface of a lens element" refers to a specific region of that surface of the lens element at which imaging rays can pass through that specific region. Imaging rays include at least two types of rays: a chief ray Lc and a marginal ray Lm (as shown in FIG. 1). An object-side (or image-side) surface of a lens element can be characterized as having several regions, including an optical axis region, a periphery region, and, in some cases, one or more intermediate regions, as discussed more fully below.

Figure 4:
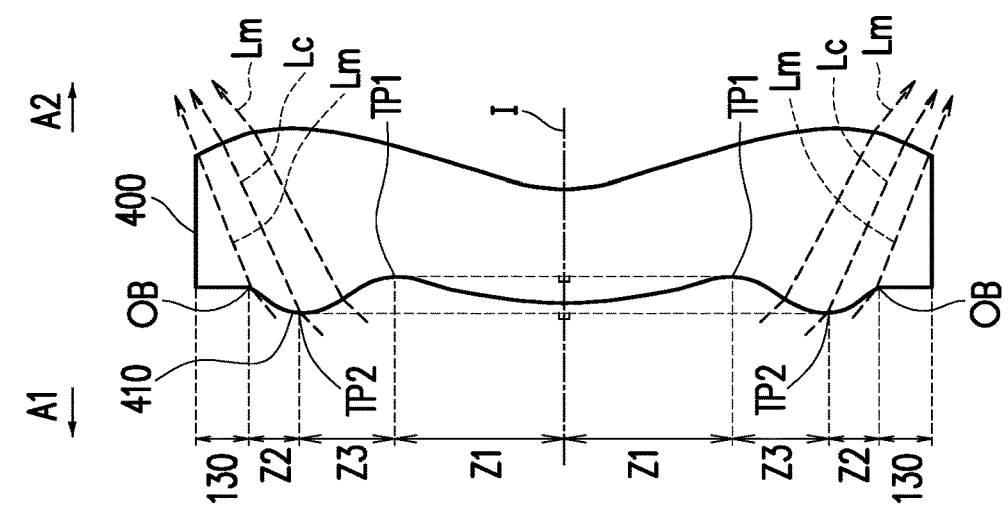
FIG. 4 is a schematic diagram illustrating a surface shape structure of a lens element of Example II.

FIG. 1 is a radial cross-sectional view of a lens element 100. Two referential points for the surfaces of the lens element 100 can be defined: a central point, and a transition point. The central point of a surface of a lens element is a point of intersection of that surface and the optical axis I. As illustrated in FIG. 1, a first central point CP1 may be present on the object-side surface 110 of lens element 100 and a second central point CP2 may be present on the image-side surface 120 of the lens element 100. The transition point is a point on a surface of a lens element, at which the line tangent to that point is perpendicular to the optical axis I. The optical boundary OB of a surface of the lens element is defined as a point at which the radially outermost marginal ray Lm passing through the surface of the lens element intersects the surface of the lens element. All transition points lie between the optical axis I and the optical boundary OB of the surface of the lens element. A surface of the lens element 100 may have no transition point or have at least one transition point. If multiple transition points are present on a single surface, then these transition points are sequentially named along the radial direction of the surface with reference numerals starting from the first transition point. For example, the first transition point, e.g., TP1, (closest to the optical axis I), the second transition point, e.g., TP2, (as shown in FIG. 4), and the Nth transition point (farthest from the optical axis I).

When a surface of the lens element has at least one transition point, the region of the surface of the lens element from the central point to the first transition point TP1 is defined as the optical axis region, which includes the central point. The region located radially outside of the farthest transition point (the Nth transition point) from the optical axis I to the optical boundary OB of the surface of the lens element is defined as the periphery region. In some embodiments, there may be intermediate regions present between the optical axis region and the periphery region, with the number of intermediate regions depending on the number of the transition points. When a surface of the lens element has no transition point, the optical axis region is defined as a region of 0%-50% of the distance between the optical axis I and the optical boundary OB of the surface of the lens element, and the periphery region is defined as a region of 50%-100% of the distance between the optical axis I and the optical boundary OB of the surface of the lens element.

The shape of a region is convex if a collimated ray being parallel to the optical axis I and passing through the region is bent toward the optical axis I such that the ray intersects the optical axis I on the image side A2 of the lens element. The shape of a region is concave if the extension line of a collimated ray being parallel to the optical axis I and passing through the region intersects the optical axis I on the object side A1 of the lens element.

Additionally, referring to FIG. 1, the lens element 100 may also have a mounting portion 130 extending radially outward from the optical boundary OB. The mounting portion 130 is typically used to physically secure the lens element to a corresponding element of the optical system (not shown). Imaging rays do not reach the mounting portion 130. The structure and shape of the mounting portion 130 are only examples to explain the technologies, and should not be taken as limiting the scope of the present disclosure. The mounting portion 130 of the lens elements discussed below may be partially or completely omitted in the following drawings.

Figure 2:
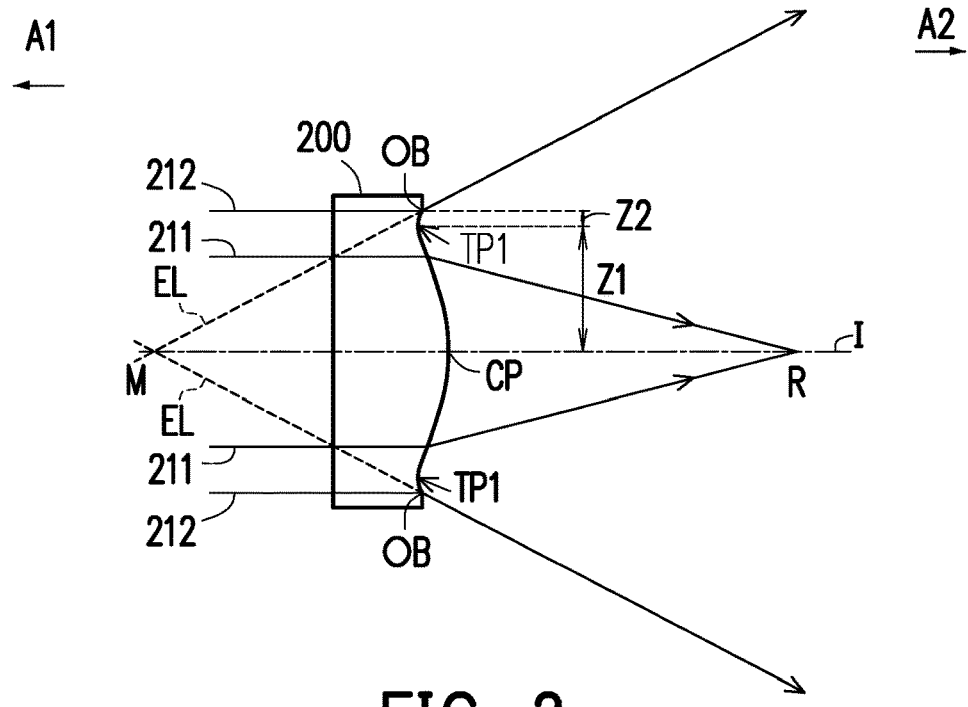
FIG. 2 is a schematic diagram illustrating a concave-convex structure and a focal point of rays of a lens element.

Referring to FIG. 2, optical axis region Z1 is defined between central point CP and first transition point TP1. Periphery region Z2 is defined between TP1 and the optical boundary OB of the surface of the lens element. Collimated ray 211 intersects the optical axis I on the image side A2 of lens element 200 after passing through optical axis region Z1, i.e., the focal point of collimated ray 211 after passing through optical axis region Z1 is on the image side A2 of the lens element 200 at point R in FIG. 2. Accordingly, since the ray itself intersects the optical axis I on the image side A2 of the lens element 200, optical axis region Z1 is convex. On the contrary, collimated ray 212 diverges after passing through periphery region Z2. The extension line EL of collimated ray 212 after passing through periphery region Z2 intersects the optical axis I on the object side A1 of lens element 200, i.e., the focal point of collimated ray 212 after passing through periphery region Z2 is on the object side A1 at point M in FIG. 2. Accordingly, since the extension line EL of the ray intersects the optical axis I on the object side A1 of the lens element 200, periphery region Z2 is concave. In the lens element 200 illustrated in FIG. 2, the first transition point TP1 is the border of the optical axis region and the periphery region, i.e., TP1 is the point at which the shape changes from convex to concave.

Alternatively, there is another way for a person having ordinary skill in the art to determine whether an optical axis region is convex or concave by referring to the sign of "Radius of curvature" (the "R" value), which is the paraxial radius of shape of a lens surface in the optical axis region. The R value is commonly used in conventional optical design software such as Zemax and CodeV. The R value usually appears in the lens data sheet in the software. For an object-side surface, a positive R value defines that the optical axis region of the object-side surface is convex, and a negative R value defines that the optical axis region of the object-side surface is concave. Conversely, for an image-side surface, a positive R value defines that the optical axis region of the image-side surface is concave, and a negative R value defines that the optical axis region of the image-side surface is convex. The result found by using this method should be consistent with the method utilizing intersection of the optical axis by rays/extension lines mentioned above, which determines surface shape by referring to whether the focal point of a collimated ray being parallel to the optical axis I is on the object-side or the image-side of a lens element. As used herein, the terms "a shape of a region is convex (concave)," "a region is convex (concave)," and "a convex- (concave-) region," can be used alternatively.

Figure 3:
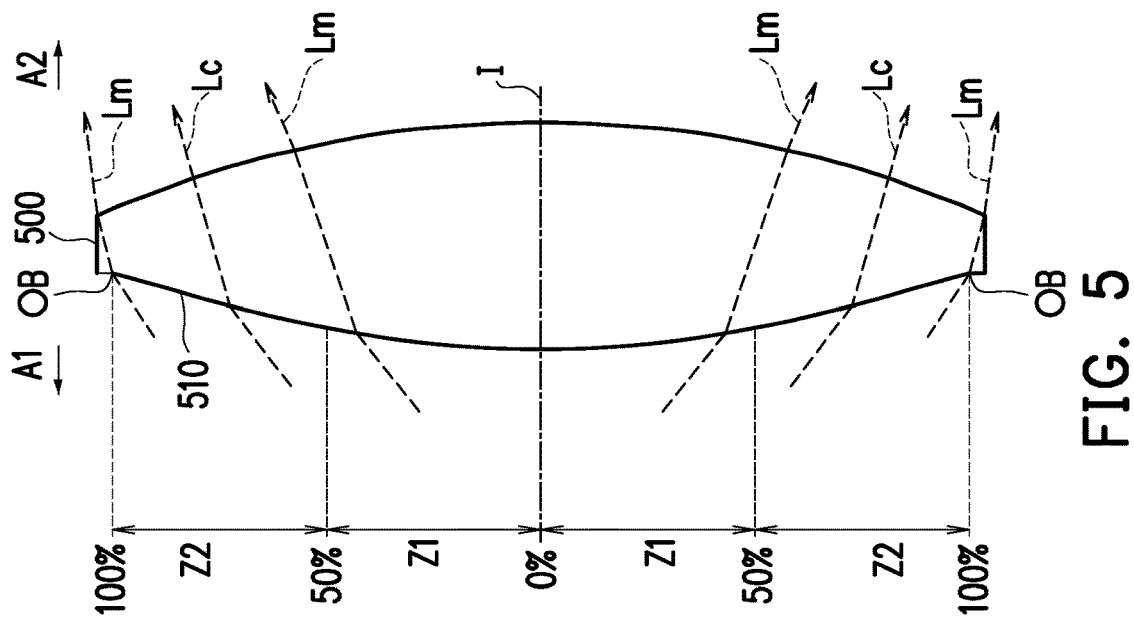
FIG. 3 is a schematic diagram illustrating a surface shape structure of a lens element of Example I.
Figure 5:
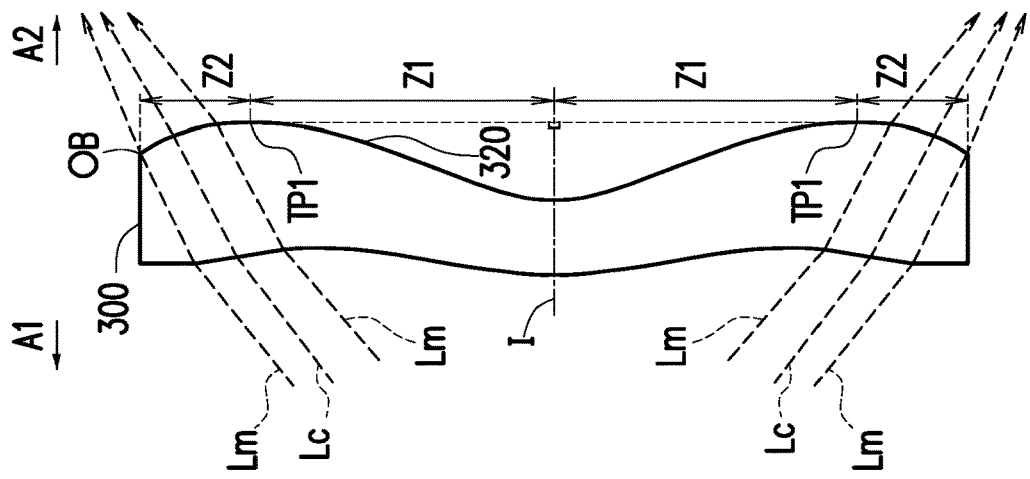
FIG. 5 is a schematic diagram illustrating a surface shape structure of a lens element of Example III.

FIG. 3, FIG. 4, and FIG. 5 illustrate examples of determining the shape of lens element regions and the boundaries of regions under various circumstances, including the optical axis region, the periphery region, and intermediate regions as set forth in the present specification.

FIG. 3 is a radial cross-sectional view of a lens element 300. As illustrated in FIG. 3, only one transition point TP1 appears within the optical boundary OB of the image-side surface 320 of the lens element 300. Optical axis region Z1 and periphery region Z2 of the image-side surface 320 of lens element 300 are illustrated. The R value of the image-side surface 320 is positive (i.e., R>0). Accordingly, the optical axis region Z1 is concave.

In general, the shape of each region demarcated by the transition point will have an opposite shape to the shape of the adjacent region(s). Accordingly, the transition point will define a transition in shape, changing from concave to convex at the transition point or changing from convex to concave. In FIG. 3, since the shape of the optical axis region Z1 is concave, the shape of the periphery region Z2 will be convex as the shape changes at the transition point TP1.

FIG. 4 is a radial cross-sectional view of a lens element 400. Referring to FIG. 4, a first transition point TP1 and a second transition point TP2 are present on the object-side surface 410 of lens element 400. The optical axis region Z1 of the object-side surface 410 is defined between the optical axis I and the first transition point TP1. The R value of the object-side surface 410 is positive (i.e., R>0). Accordingly, the optical axis region Z1 is convex.

The periphery region Z2 of the object-side surface 410, which is also convex, is defined between the second transition point TP2 and the optical boundary OB of the object-side surface 410 of the lens element 400. Further, intermediate region Z3 of the object-side surface 410, which is concave, is defined between the first transition point TP1 and the second transition point TP2. Referring once again to FIG. 4, the object-side surface 410 includes an optical axis region Z1 located between the optical axis I and the first transition point TP1, an intermediate region Z3 located between the first transition point TP1 and the second transition point TP2, and a periphery region Z2 located between the second transition point TP2 and the optical boundary OB of the object-side surface 410. Since the shape of the optical axis region Z1 is designed to be convex, the shape of the intermediate region Z3 is concave as the shape of the intermediate region Z3 changes at the first transition point TP1, and the shape of the periphery region Z2 is convex as the shape of the periphery region Z2 changes at the second transition point TP2.

FIG. 5 is a radial cross-sectional view of a lens element 500. Lens element 500 has no transition point on the object-side surface 510 of the lens element 500. For a surface of a lens element with no transition point, for example, the object-side surface 510 the lens element 500, the optical axis region Z1 is defined as the region of 0%-50% of the distance between the optical axis I and the optical boundary OB of the surface of the lens element and the periphery region is defined as the region of 50%-100% of the distance between the optical axis I and the optical boundary OB of the surface of the lens element. Referring to lens element 500 illustrated in FIG. 5, the optical axis region Z1 of the object-side surface 510 is defined between the optical axis I and 50% of the distance between the optical axis I and the optical boundary OB. The R value of the object-side surface 510 is positive (i.e., R>0). Accordingly, the optical axis region Z1 is convex. For the object-side surface 510 of the lens element 500, because there is no transition point, the periphery region Z2 of the object-side surface 510 is also convex. It should be noted that lens element 500 may have a mounting portion (not shown) extending radially outward from the periphery region Z2.

FIG. 6 is a schematic diagram of an optical imaging lens of the first embodiment of the disclosure, and FIG. 7A to FIG. 7D are diagrams of longitudinal spherical aberrations and various aberrations of the optical imaging lens of the first embodiment. With reference to FIG. 6 first, an optical imaging lens 10 of the first embodiment of the disclosure includes an aperture 0, a first lens element 1, a second lens element 2, a third lens element 3, a fourth lens element 4, a fifth lens element 5, a sixth lens element 6, a seventh lens element 7, an eighth lens element 8, a ninth lens element 9, and a filter 11 sequentially arranged along an optical axis I of the optical imaging lens 10 from an object side A1 to an image side A2. Rays emitted by an object to be photographed that enter the optical imaging lens 10 may form an image on an image plane 99 after sequentially passing through the aperture 0, the first lens element 1, the second lens element 2, the third lens element 3, the fourth lens element 4, the fifth lens element 5, the sixth lens element 6, the seventh lens element 7, the eighth lens element 8, the ninth lens element 9, and the filter 11. It is supplemented that the object side A1 is a side facing the object to be photographed, and the image side A2 is a side facing the image plane 99.

In this embodiment, each of the first lens element 1, the second lens element 2, the third lens element 3, the fourth lens element 4, the fifth lens element 5, the sixth lens element 6, the seventh lens element 7, the eighth lens element 8, the ninth lens element 9, and the filter 11 of the optical imaging lens 10 has an object-side surface 15, 25, 35, 45, 55, 65, 75, 85, 95, 115 facing the object side A1 and allowing imaging rays to pass through, and an image-side surface 16, 26, 36, 46, 56, 66, 76, 86, 96, 116 facing the image side A2 and allowing the imaging rays to pass through. In this embodiment, the aperture 0 is disposed on a side facing the object side A1 of the first lens element 1. The filter 11 is disposed between the image-side surface 96 of the ninth lens element 9 and the image plane 99, and the filter 11 may be an infrared (IR) cut filter allowing rays of other wavelengths to pass through and blocking rays of infrared wavelengths, but the disclosure is not limited thereto.

The first lens element 1 has positive refracting power. A material of the first lens element 1 is plastic, but the disclosure is not limited thereto. An optical axis region 151 of the object-side surface 15 of the first lens element 1 is convex, and a periphery region 153 thereof is convex. An optical axis region 162 of the image-side surface 16 of the first lens element 1 is concave, and a periphery region 164 thereof is concave. In this embodiment, both the object-side surface 15 and the image-side surface 16 of the first lens element 1 are aspheric surfaces.

The second lens element 2 has negative refracting power. A material of the second lens element 2 is plastic, but the disclosure is not limited thereto. An optical axis region 251 of the object-side surface 25 of the second lens element 2 is convex, and a periphery region 253 thereof is concave. An optical axis region 262 of the image-side surface 26 of the second lens element 2 is concave, and a periphery region 264 thereof is concave. In this embodiment, both the object-side surface 25 and the image-side surface 26 of the second lens element 2 are aspheric surfaces.

The third lens element 3 has negative refracting power. A material of the third lens element 3 is plastic, but the disclosure is not limited thereto. An optical axis region 351 of the object-side surface 35 of the third lens element 3 is convex, and a periphery region 353 thereof is convex. An optical axis region 362 of the image-side surface 36 of the third lens element 3 is concave, and a periphery region 364 thereof is concave. In this embodiment, both the object-side surface 35 and the image-side surface 36 of the third lens element 3 are aspheric surfaces.

The fourth lens element 4 has positive refracting power. A material of the fourth lens element 4 is plastic, but the disclosure is not limited thereto. An optical axis region 451 of the object-side surface 45 of the fourth lens element 4 is convex, and a periphery region 453 thereof is convex. An optical axis region 462 of the image-side surface 46 of the fourth lens element 4 is concave, and a periphery region 463 thereof is convex. In this embodiment, both the object-side surface 45 and the image-side surface 46 of the fourth lens element 4 are aspheric surfaces.

The fifth lens element 5 has negative refracting power. A material of the fifth lens element 5 is plastic, but the disclosure is not limited thereto. An optical axis region 552 of the object-side surface 55 of the fifth lens element 5 is concave, and a periphery region 554 thereof is concave. An optical axis region 561 of the image-side surface 56 of the fifth lens element 5 is convex, and a periphery region 563 thereof is convex. In this embodiment, both the object-side surface 55 and the image-side surface 56 of the fifth lens element 5 are aspheric surfaces.

The sixth lens element 6 has positive refracting power. A material of the sixth lens element 6 is plastic, but the disclosure is not limited thereto. An optical axis region 652 of the object-side surface 65 of the sixth lens element 6 is concave, and a periphery region 654 thereof is concave. An optical axis region 661 of the image-side surface 66 of the sixth lens element 6 is convex, and a periphery region 663 thereof is convex. In this embodiment, both the object-side surface 65 and the image-side surface 66 of the sixth lens element 6 are aspheric surfaces.

The seventh lens element 7 has positive refracting power. A material of the seventh lens element 7 is plastic, but the disclosure is not limited thereto. An optical axis region 751 of the object-side surface 75 of the seventh lens element 7 is convex, and a periphery region 754 thereof is concave. An optical axis region 762 of the image-side surface 76 of the seventh lens element 7 is concave, and a periphery region 763 thereof is convex. In this embodiment, both the object-side surface 75 and the image-side surface 76 of the seventh lens element 7 are aspheric surfaces.

The eighth lens element 8 has positive refracting power. A material of the eighth lens element 8 is plastic, but the disclosure is not limited thereto. An optical axis region 851 of the object-side surface 85 of the eighth lens element 8 is convex, and a periphery region 854 thereof is concave. An optical axis region 861 of the image-side surface 86 of the eighth lens element 8 is convex, and a periphery region 863 thereof is convex. In this embodiment, both the object-side surface 85 and the image-side surface 86 of the eighth lens element 8 are aspheric surfaces.

The ninth lens element 9 has negative refracting power. A material of the ninth lens element 9 is plastic, but the disclosure is not limited thereto. An optical axis region 952 of the object-side surface 95 of the ninth lens element 9 is concave, and a periphery region 953 thereof is convex. An optical axis region 962 of the image-side surface 96 of the ninth lens element 9 is concave, and a periphery region 963 thereof is convex. In this embodiment, both the object-side surface 95 and the image-side surface 96 of the ninth lens element 9 are aspheric surfaces.

In this embodiment, lens elements of the optical imaging lens 10 are only the nine lens elements in total: the first lens element 1, the second lens element 2, the third lens element 3, the fourth lens element 4, the fifth lens element 5, the sixth lens element 6, the seventh lens element 7, the eighth lens element 8, and the ninth lens element 9.

Other detailed optical data of the first embodiment is as shown in FIG. 8, and the optical imaging lens 10 of the first embodiment has an effective focal length (EFL) of 7.135 millimeters (mm), a half field of view (HFOV) of 40.835°, a system length (TTL) of 8.996 mm, an f-number (Fno) of 1.800, and an image height (ImgH) of 6.700 mm. The system length is a distance from the object-side surface 15 of the first lens element 1 to the image plane 99 on the optical axis I.

In addition, in this embodiment, the object-side surfaces 15, 25, 35, 45, 55, 65, 75, 85, 95 and the image-side surfaces 16, 26, 36, 46, 56, 66, 76, 86, 96 of the first lens element 1, the second lens element 2, the third lens element 3, the fourth lens element 4, the fifth lens element 5, the sixth lens element 6, the seventh lens element 7, the eighth lens element 8, and the ninth lens element 9 are all aspheric surfaces, and these aspheric surfaces are defined according to the following formula:

$$Z(Y) = \frac{Y^2}{R} \bigg/ \left(1 + \sqrt{1 - (1+K)\frac{Y^2}{R^2}}\right) + \sum_{i=1}^{n} a_i \times Y^i \quad \text{Formula (1)}$$

where:
Y: a perpendicular distance between a point on an aspheric surface and the optical axis I;
Z: a depth of an aspheric surface (a perpendicular distance between a point, which is Y away from the optical axis I, on the aspheric surface and a tangent plane tangent to a vertex on the aspheric optical axis I);
R: a radius of curvature of a surface of a lens element close to the optical axis I;
K: conic constant; and
$a_i$: the ith order aspheric coefficient.

Various aspheric coefficients of the object-side surface 15 of the first lens element 1 to the image-side surface 96 of the ninth lens element 9 in Formula (1) are as shown in FIG. 9. Column number 15 in FIG. 9 denotes an aspheric coefficient of the object-side surface 15 of the first lens element 1, and the rest columns may be deduced by analogy. The odd-order aspheric coefficients (e.g., $a_1$, $a_3$, $a_5$, $a_7$, etc.) and the second-order aspheric coefficient ($a_2$) not listed in the table of FIG. 9 and the tables of various embodiments are all 0.

In addition, the relations among all the important parameters of the optical imaging lens 10 of the first embodiment are as shown in FIG. 30, where T1 is a thickness of the first lens element 1 on the optical axis I;
T2 is a thickness of the second lens element 2 on the optical axis I;
T3 is a thickness of the third lens element 3 on the optical axis I;
T4 is a thickness of the fourth lens element 4 on the optical axis I;
T5 is a thickness of the fifth lens element 5 on the optical axis I;
T6 is a thickness of the sixth lens element 6 on the optical axis I;
T7 is a thickness of the seventh lens element 7 on the optical axis I;
T8 is a thickness of the eighth lens element 8 on the optical axis I;
T9 is a thickness of the ninth lens element 9 on the optical axis I;
G12 is an air gap between the first lens element 1 and the second lens element 2 on the optical axis I, i.e., a distance from the image-side surface 16 of the first lens element 1 to the object-side surface 25 of the second lens element 2 on the optical axis I;
G23 is an air gap between the second lens element 2 and the third lens element 3 on the optical axis I, i.e., a distance from the image-side surface 26 of the second lens element 2 to the object-side surface 35 of the third lens element 3 on the optical axis I;
G34 is an air gap between the third lens element 3 and the fourth lens element 4 on the optical axis I, i.e., a distance from the image-side surface 36 of the third lens element 3 to the object-side surface 45 of the fourth lens element 4 on the optical axis I;
G45 is an air gap between the fourth lens element 4 and the fifth lens element 5 on the optical axis I, i.e., a distance from the image-side surface 46 of the fourth lens element 4 to the object-side surface 55 of the fifth lens element 5 on the optical axis I;
G56 is an air gap between the fifth lens element 5 and the sixth lens element 6 on the optical axis I, i.e., a distance from the image-side surface 56 of the fifth lens element 5 to the object-side surface 65 of the sixth lens element 6 on the optical axis I;
G67 is an air gap between the sixth lens element 6 and the seventh lens element 7 on the optical axis I, i.e., a distance from the image-side surface 66 of the sixth lens element 6 to the object-side surface 75 of the seventh lens element 7 on the optical axis I;
G78 is an air gap between the seventh lens element 7 and the eighth lens element 8 on the optical axis I, i.e., a distance from the image-side surface 76 of the seventh lens element 7 to the object-side surface 85 of the eighth lens element 8 on the optical axis I;
G89 is an air gap between the eighth lens element 8 and the ninth lens element 9 on the optical axis I, i.e., a distance from the image-side surface 86 of the eighth lens element 8 to the object-side surface 95 of the ninth lens element 9 on the optical axis I;

AAG is a sum of eight air gaps from the first lens element 1 to the ninth lens element 9 on the optical axis I, i.e., a sum of G12, G23, G34, G45, G56, G67, G78, and G89;

ALT is a sum of the thicknesses of the nine lens elements from the first lens element 1 to the ninth lens element 9 on the optical axis I, i.e., a sum of T1, T2, T3, T4, T5, T6, T7, T8, and T9;

TL is a distance from the object-side surface 15 of the first lens element 1 to the image-side surface 96 of the ninth lens element 9 on the optical axis I;

TTL is a distance from the object-side surface 15 of the first lens element 1 to the image plane 99 on the optical axis I;

BFL is a distance from the image-side surface 96 of the ninth lens element 9 to the image plane 99 on the optical axis I;

D12t31 is a distance from the image-side surface 16 of the first lens element 1 to the object-side surface 35 of the third lens element 3 on the optical axis I, i.e., a sum of G12, T2, and G23;

D32t51 is a distance from the image-side surface 36 of the third lens element 3 to the object-side surface 55 of the fifth lens element 5 on the optical axis I, i.e., a sum of G34, T4, and G45;

D61t71 is a distance from the object-side surface 65 of the sixth lens element 6 to the object-side surface 75 of the seventh lens element 7 on the optical axis I, i.e., a sum of T6 and G67;

HFOV is a half field of view of the optical imaging lens 10;

Fno is an f-number of the optical imaging lens 10;

ImgH is an image height of the optical imaging lens 10; and

EFL is an effective focal length of the optical imaging lens 10.

Moreover, it is further defined that:

G9F is an air gap between the ninth lens element 9 and the filter 11 on the optical axis I, i.e., a distance from the image-side surface 96 of the ninth lens element 9 to the object-side surface 115 of the filter 11 on the optical axis I;

TF is a thickness of the filter 11 on the optical axis I;

GFP is an air gap between the filter 11 and the image plane 99 on the optical axis I, i.e., a distance from the image-side surface 116 of the filter 11 to the image plane 99 on the optical axis I;

f1 is a focal length of the first lens element 1;
f2 is a focal length of the second lens element 2;
f3 is a focal length of the third lens element 3;
f4 is a focal length of the fourth lens element 4;
f5 is a focal length of the fifth lens element 5;
f6 is a focal length of the sixth lens element 6;
f7 is a focal length of the seventh lens element 7;
f8 is a focal length of the eighth lens element 8;
f9 is a focal length of the ninth lens element 9;
n1 is a refractive index of the first lens element 1;
n2 is a refractive index of the second lens element 2;
n3 is a refractive index of the third lens element 3;
n4 is a refractive index of the fourth lens element 4;
n5 is a refractive index of the fifth lens element 5;
n6 is a refractive index of the sixth lens element 6;
n7 is a refractive index of the seventh lens element 7;
n8 is a refractive index of the eighth lens element 8;
n9 is a refractive index of the ninth lens element 9;
V1 is an Abbe number of the first lens element 1;
V2 is an Abbe number of the second lens element 2;
V3 is an Abbe number of the third lens element 3;
V4 is an Abbe number of the fourth lens element 4;
V5 is an Abbe number of the fifth lens element 5;
V6 is an Abbe number of the sixth lens element 6;
V7 is an Abbe number of the seventh lens element 7;
V8 is an Abbe number of the eighth lens element 8, and
V9 is an Abbe number of the ninth lens element 9.

Furthermore, with reference to FIG. 7A to FIG. 7D, the diagram of FIG. 7A illustrates a longitudinal spherical aberration of the first embodiment; the diagrams of FIG. 7B and FIG. 7C respectively illustrate a field curvature aberration in a sagittal direction and a field curvature aberration in a tangential direction on the image plane 99 of the first embodiment at wavelengths of 470 nanometers (nm), 555 nm and 650 nm. The diagram of FIG. 7D illustrates a distortion aberration on the image plane 99 of the first embodiment at wavelengths of 470 nm, 555 nm, and 650 nm. In FIG. 7A which shows the longitudinal spherical aberration of the first embodiment, a curve generated by each wavelength is very close, and is close to the center, which indicates that off-axis rays at different heights of each wavelength are concentrated near to an imaging point. According to the deflection amplitude of the curve of each wavelength, deflections of the imaging points of the off-axis rays at different heights are controlled within a range of ±14 microns (μm), so that the first embodiment obviously improves the spherical aberration of the same wavelength in deed. In addition, distances between three representative wavelengths are quite close, indicating that imaging positions of different wavelength rays are quite concentrated, so that the chromatic aberration is also obviously improved.

In the two field curvature aberration diagrams of FIG. 7B and FIG. 7C, the field curvature aberrations of three representative wavelengths within an entire field of view range fall within ±35 μm, indicating that an optical system of the first embodiment may effectively eliminate the aberration. The distortion aberration diagram of FIG. 7D shows that the distortion aberration of the first embodiment is maintained within a range of ±9%, indicating that the distortion aberration of the first embodiment may meet an imaging quality requirement of the optical system. Accordingly, it is indicated that compared with an existing optical imaging lens, the optical imaging lens of the first embodiment, in the circumstances that the system length is 8.996 mm, may still provide the Fno of 1.800 and the image height of 6.700 mm, as well as favorable imaging quality and good chromatic aberration control.

FIG. 10 is a schematic diagram of an optical imaging lens of the second embodiment of the disclosure, and FIG. 11A to FIG. 11D are diagrams of longitudinal spherical aberrations and various aberrations of the optical imaging lens of the second embodiment. With reference to FIG. 10 first, the second embodiment of the optical imaging lens 10 of the disclosure is approximately similar to the first embodiment, except that: various optical data, aspheric coefficients, and parameters among the lens elements 1, 2, 3, 4, 5, 6, 7, 8, and 9 are different more or less. It should be noted that in order to show the drawing clearly, numerals of the optical axis regions and the periphery regions which are similar to those in the first embodiment are omitted in FIG. 10.

Detailed optical data of the optical imaging lens 10 of the second embodiment are as shown in FIG. 12, and the optical imaging lens 10 of the second embodiment has an EFL of 7.115 mm, an HFOV of 40.364°, a TTL of 8.988 mm, an Fno of 1.800, and an ImgH of 6.700 mm.

As shown in FIG. 13, various aspheric coefficients of the object-side surface 15 of the first lens element 1 to the image-side surface 96 of the ninth lens element 9 of the second embodiment in Formula (1) are illustrated.

In addition, the relations among all the important parameters of the optical imaging lens 10 of the second embodiment are as shown in FIG. 30.

In FIG. 11A, which illustrates a longitudinal spherical aberration of the second embodiment, deflections of imaging points of off-axis rays at different heights are controlled within a range of ±12 µm. In the two field curvature aberration diagrams of FIG. 11B and FIG. 11C, the field curvature aberrations of three representative wavelengths within an entire field of view range fall within ±50 µm. The distortion aberration diagram of FIG. 11D shows that the distortion aberration of the second embodiment is maintained within a range of ±11%. Accordingly, it is indicated that compared with the existing optical imaging lens, the second embodiment, in the circumstances that the system length is 8.988 mm, may still provide the Fno of 1.800 and the image height of 6.700 mm, as well as favorable imaging quality and good chromatic aberration control.

According to the above description, compared with the first embodiment, the second embodiment has the advantages that: the TTL of the second embodiment is shorter than that of the first embodiment, and the longitudinal spherical aberration of the second embodiment is better than that of the first embodiment.

Figure 14:
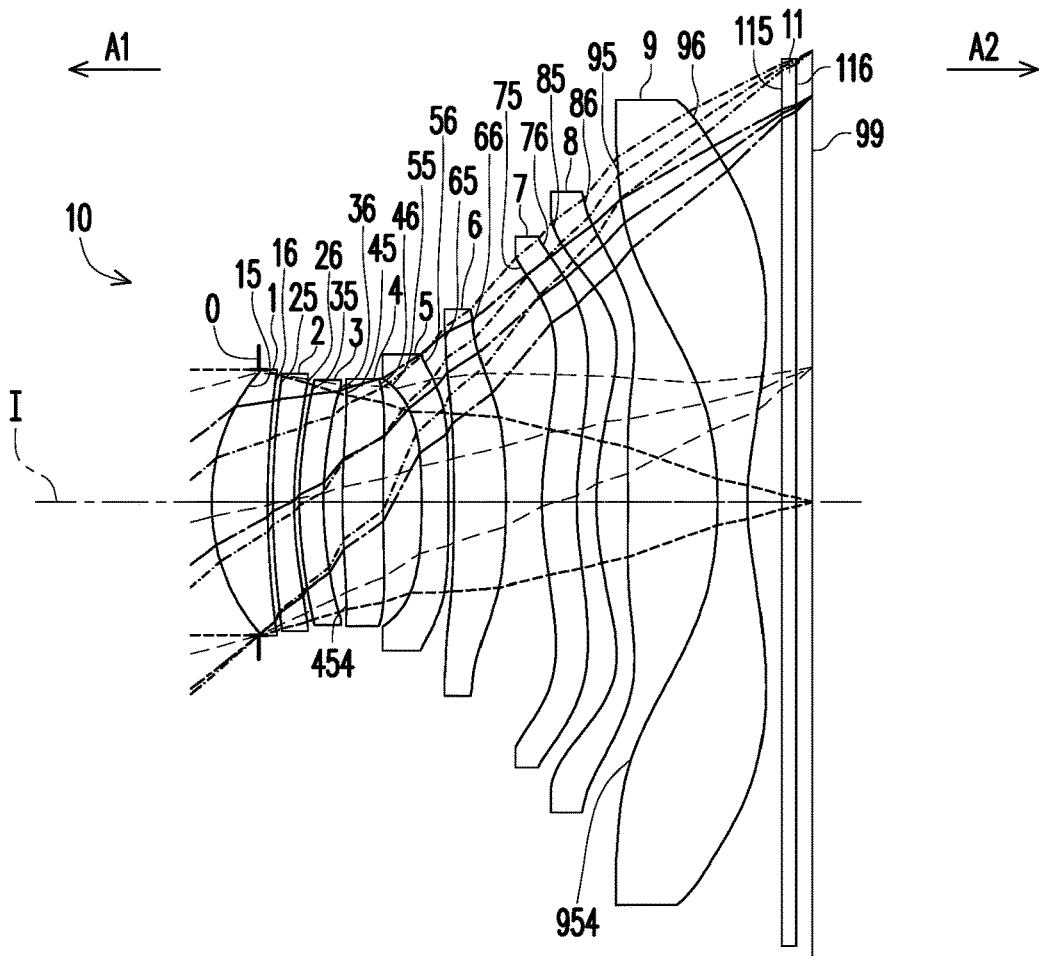
FIG. 14 is a schematic diagram of an optical imaging lens of the third embodiment of the disclosure.

FIG. 14 is a schematic diagram of an optical imaging lens of the third embodiment of the disclosure, and FIG. 15A to FIG. 15D are diagrams of longitudinal spherical aberrations and various aberrations of the optical imaging lens of the third embodiment. With reference to FIG. 14 first, the third embodiment of the optical imaging lens 10 of the disclosure is approximately similar to the first embodiment, except that: various optical data, aspheric coefficients, and parameters among the lens elements 1, 2, 3, 4, 5, 6, 7, 8, and 9 are different more or less. In addition, in this embodiment, the periphery region 454 of the object-side surface 45 of the fourth lens element 4 is concave, and the periphery region 954 of the object-side surface 95 of the ninth lens element 9 is concave. It should be noted that in order to show the drawing clearly, numerals of the optical axis regions and the periphery regions which are similar to those in the first embodiment are omitted in FIG. 14.

Detailed optical data of the optical imaging lens 10 of the third embodiment are as shown in FIG. 16, and the optical imaging lens 10 of the third embodiment has an EFL of 7.091 mm, an HFOV of 41.312°, a TTL of 8.901 mm, an Fno of 1.800, and an ImgH of 6.700 mm.

As shown in FIG. 17, various aspheric coefficients of the object-side surface 15 of the first lens element 1 to the image-side surface 96 of the ninth lens element 9 of the third embodiment in Formula (1) are illustrated.

In addition, the relations among all the important parameters of the optical imaging lens 10 of the third embodiment are as shown in FIG. 30.

Figure 15A:
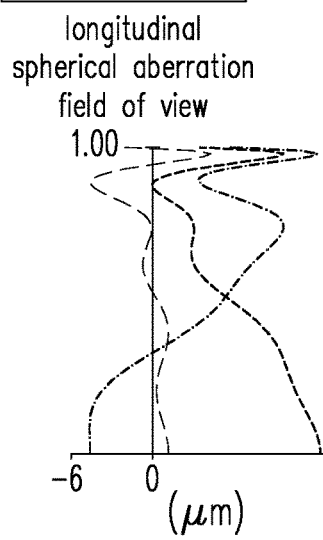
FIG. 15A to FIG. 15D are diagrams of longitudinal spherical aberrations and various aberrations of the optical imaging lens of the third embodiment.
Figure 15B:
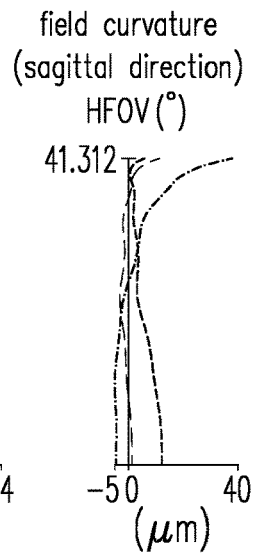
Figure 15C:
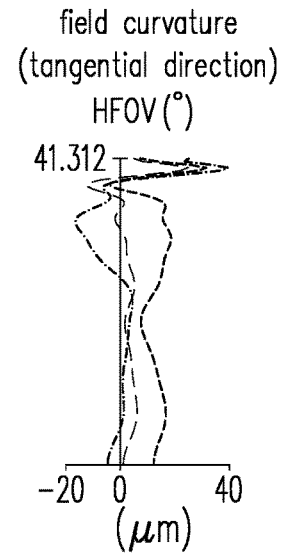
Figure 15D:
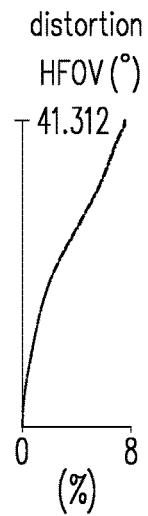

In FIG. 15A, which illustrates a longitudinal spherical aberration of the third embodiment, deflections of imaging points of off-axis rays at different heights are controlled within a range of ±13 µm. In the two field curvature aberration diagrams of FIG. 15B and FIG. 15C, the field curvature aberrations of three representative wavelengths within an entire field of view range fall within ±40 µm. The distortion aberration diagram of FIG. 15D shows that the distortion aberration of the third embodiment is maintained within a range of ±8%. Accordingly, it is indicated that compared with the existing optical imaging lens, the third embodiment, in the circumstances that the system length is 8.901 mm, may still provide the Fno of 1.800 and the image height of 6.700 mm, as well as favorable imaging quality and good chromatic aberration control.

According to the above description, compared with the first embodiment, the third embodiment has the advantages that: the TTL of the third embodiment is shorter than that of the first embodiment, the HFOV of the third embodiment is greater than that of the first embodiment, and the longitudinal spherical aberration and the distortion aberration of the third embodiment are better than those of the first embodiment.

Figure 18:
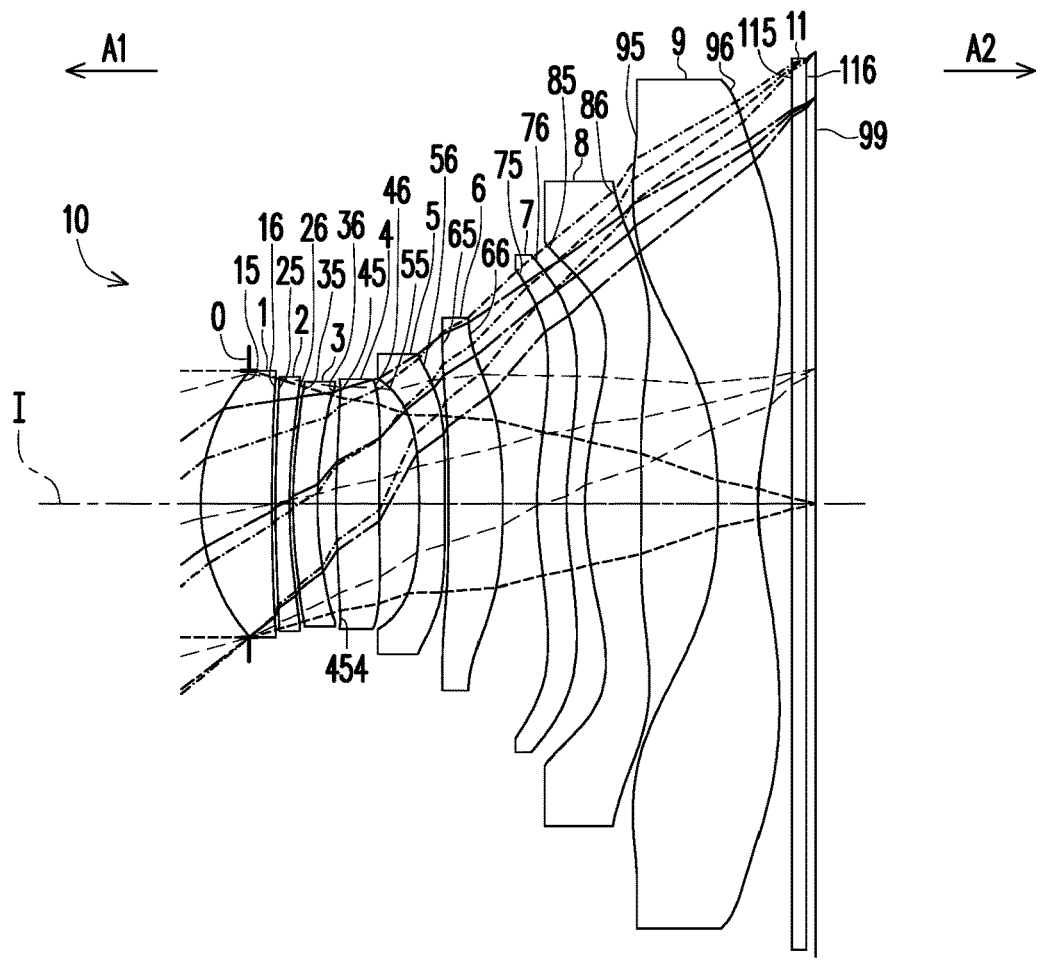
FIG. 18 is a schematic diagram of an optical imaging lens of the fourth embodiment of the disclosure.

FIG. 18 is a schematic diagram of an optical imaging lens of the fourth embodiment of the disclosure, and FIG. 19A to FIG. 19D are diagrams of longitudinal spherical aberrations and various aberrations of the optical imaging lens of the fourth embodiment. With reference to FIG. 18 first, the fourth embodiment of the optical imaging lens 10 of the disclosure is approximately similar to the first embodiment, except that: various optical data, aspheric coefficients, and parameters among the lens elements 1, 2, 3, 4, 5, 6, 7, 8, and 9 are different more or less. In addition, in this embodiment, the seventh lens element 7 has negative refracting power, and the periphery region 454 of the object-side surface 45 of the fourth lens element 4 is concave. It should be noted that in order to show the drawing clearly, numerals of the optical axis regions and the periphery regions which are similar to those in the first embodiment are omitted in FIG. 18.

Detailed optical data of the optical imaging lens 10 of the fourth embodiment are as shown in FIG. 20, and the optical imaging lens 10 of the fourth embodiment has an EFL of 7.115 mm, an HFOV of 40.105°, a TTL of 9.111 mm, an Fno of 1.800, and an ImgH of 6.700 mm.

As shown in FIG. 21, various aspheric coefficients of the object-side surface 15 of the first lens element 1 to the image-side surface 96 of the ninth lens element 9 of the fourth embodiment in Formula (1) are illustrated.

In addition, the relations among all the important parameters of the optical imaging lens 10 of the fourth embodiment are as shown in FIG. 30.

Figure 19A:
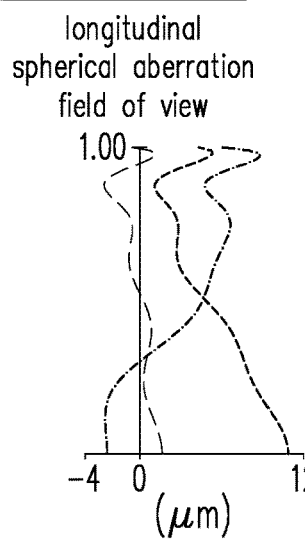
FIG. 19A to FIG. 19D are diagrams of longitudinal spherical aberrations and various aberrations of the optical imaging lens of the fourth embodiment.
Figure 19B:
Figure 19C:
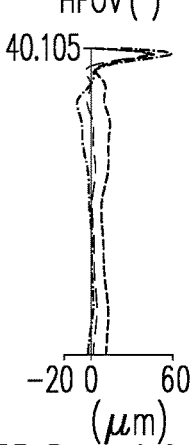
Figure 19D:
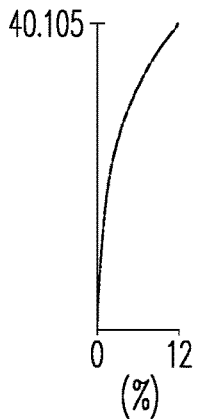

In FIG. 19A, which illustrates a longitudinal spherical aberration of the fourth embodiment, deflections of imaging points of off-axis rays at different heights are controlled within a range of ±11 µm. In the two field curvature aberration diagrams of FIG. 19B and FIG. 19C, the field curvature aberrations of three representative wavelengths within an entire field of view range fall within ±60 µm. The distortion aberration diagram of FIG. 19D shows that the distortion aberration of the fourth embodiment is maintained within a range of ±12%. Accordingly, it is indicated that compared with the existing optical imaging lens, the fourth embodiment, in the circumstances that the system length is 9.111 mm, may still provide the Fno of 1.800 and the image height of 6.700 mm, as well as favorable imaging quality and good chromatic aberration control.

According to the above description, compared with the first embodiment, the fourth embodiment has the advantage that: the longitudinal spherical aberration of the fourth embodiment is better than that of the first embodiment.

FIG. 22 is a schematic diagram of an optical imaging lens of the fifth embodiment of the disclosure, and FIG. 23A to FIG. 23D are diagrams of longitudinal spherical aberrations and various aberrations of the optical imaging lens of the fifth embodiment. With reference to FIG. 22 first, the fifth embodiment of the optical imaging lens 10 of the disclosure is approximately similar to the first embodiment, except that: various optical data, aspheric coefficients, and parameters among the lens elements 1, 2, 3, 4, 5, 6, 7, 8, and 9 are different more or less. In addition, in this embodiment, the third lens element 3 has positive refracting power, the seventh lens element 7 has negative refracting power, the periphery region 454 of the object-side surface 45 of the fourth lens element 4 is concave, the optical axis region 461 of the image-side surface 46 of the fourth lens element 4 is convex, and the periphery region 954 of the object-side surface 95 of the ninth lens element 9 is concave. It should be noted that in order to show the drawing clearly, numerals of the optical axis regions and the periphery regions which are similar to those in the first embodiment are omitted in FIG. 22.

Detailed optical data of the optical imaging lens 10 of the fifth embodiment are as shown in FIG. 24, and the optical imaging lens 10 of the fourth embodiment has an EFL of 6.206 mm, an HFOV of 40.971°, a TTL of 9.280 mm, an Fno of 1.800, and an ImgH of 6.700 mm.

As shown in FIG. 25, various aspheric coefficients of the object-side surface 15 of the first lens element 1 to the image-side surface 96 of the ninth lens element 9 of the fifth embodiment in Formula (1) are illustrated.

In addition, the relations among all the important parameters of the optical imaging lens 10 of the fifth embodiment are as shown in FIG. 30.

In FIG. 23A, which illustrates a longitudinal spherical aberration of the fifth embodiment, deflections of imaging points of off-axis rays at different heights are controlled within a range of ±75 µm. In the two field curvature aberration diagrams of FIG. 23B and FIG. 23C, the field curvature aberrations of three representative wavelengths within an entire field of view range fall within ±80 µm. The distortion aberration diagram of FIG. 23D shows that the distortion aberration of the fifth embodiment is maintained within a range of ±25%. Accordingly, it is indicated that compared with the existing optical imaging lens, the fifth embodiment, in the circumstances that the system length is 9.280 mm, may still provide the Fno of 1.800 and the image height of 6.700 mm, as well as favorable imaging quality and good chromatic aberration control.

According to the above description, compared with the first embodiment, the fifth embodiment has the advantage that: the HFOV of the fifth embodiment is greater than that of the first embodiment.

FIG. 26 is a schematic diagram of an optical imaging lens of the sixth embodiment of the disclosure, and FIG. 27A to FIG. 27D are diagrams of longitudinal spherical aberrations and various aberrations of the optical imaging lens of the sixth embodiment. With reference to FIG. 26 first, the sixth embodiment of the optical imaging lens 10 of the disclosure is approximately similar to the first embodiment, except that: various optical data, aspheric coefficients, and parameters among the lens elements 1, 2, 3, 4, 5, 6, 7, 8, and 9 are different more or less. In addition, in this embodiment, the third lens element 3 has positive refracting power, the fifth lens element 5 has positive refracting power, the sixth lens element 6 has negative refracting power, the seventh lens element 7 has negative refracting power, the periphery region 363 of the image-side surface 36 of the third lens element 3 is convex, and the periphery region 454 of the object-side surface 45 of the fourth lens element 4 is concave. It should be noted that in order to show the drawing clearly, numerals of the optical axis regions and the periphery regions which are similar to those in the first embodiment are omitted in FIG. 26.

Detailed optical data of the optical imaging lens 10 of the sixth embodiment are as shown in FIG. 28, and the optical imaging lens 10 of the sixth embodiment has an EFL of 7.905 mm, an HFOV of 36.173°, a TTL of 9.723 mm, an Fno of 1.800, and an ImgH of 6.700 mm.

As shown in FIG. 29, various aspheric coefficients of the object-side surface 15 of the first lens element 1 to the image-side surface 96 of the ninth lens element 9 of the sixth embodiment in Formula (1) are illustrated.

In addition, the relations among all the important parameters of the optical imaging lens 10 of the sixth embodiment are as shown in FIG. 30.

In FIG. 27A, which illustrates a longitudinal spherical aberration of the sixth embodiment, deflections of imaging points of off-axis rays at different heights are controlled within a range of ±13 µm. In the two field curvature aberration diagrams of FIG. 27B and FIG. 27C, the field curvature aberrations of three representative wavelengths within an entire field of view range fall within ±70 µm. The distortion aberration diagram of FIG. 27D shows that the distortion aberration of the sixth embodiment is maintained within a range of ±16%. Accordingly, it is indicated that compared with the existing optical imaging lens, the sixth embodiment, in the circumstances that the system length is approximately 9.723 mm, may still provide the Fno of 1.800 and the image height of 6.700 mm, as well as favorable imaging quality and good chromatic aberration control.

According to the above description, compared with the first embodiment, the sixth embodiment has the advantage that: the longitudinal spherical aberration of the sixth embodiment is better than that of the first embodiment.

A designer may be assisted in designing a technically feasible optical imaging lens that has a relatively small Fno, a relatively great image height, and a relatively small volume via numerical value control of all the following parameters.

The optical imaging lenses in the embodiments of the disclosure may converge rays of different angles when the conditions that the first lens element has positive refracting power and the second lens element has negative refracting power are satisfied, and may correct the aberration of the field of view at the center of the image plane in cooperation with the convex optical axis region of the image-side surface of the fifth lens element and the concave optical axis region of the image-side surface of the seventh lens element. Meanwhile, in cooperation with the eighth lens element having positive refracting power or the ninth lens element having negative refracting power, the image height may be increased and the distortion may be reduced. Furthermore, in cooperation with the thicknesses of the lens elements and the air gaps satisfying T9/T8≥0.700 and D32t51/D12t31≥1.600, not only the system length may be reduced but also the assembly yield may be enhanced. A preferred range of T9/T8 and D32t51/D12t31 is respectively 0.700≤T9/T8≤1.100 and 1.600≤D32t51/D12t31≤5.300.

In addition, when further satisfying the condition that the fourth lens element has positive refracting power, the optical imaging lenses may balance the spherical aberration caused by the first lens element and the second lens element, ameliorating the flare phenomenon.

The optical imaging lenses, when satisfying the conditions that the first lens element has positive refracting power and the second lens element has negative refracting power, may converge rays of different angles and may correct the aberration of the field of view at the center of the image plane in cooperation with the convex optical axis region of the image-side surface of the fifth lens element, the convex optical axis region of the object-side surface of the seventh lens element, and the convex optical axis region of the object-side surface of the eighth lens element. Meanwhile, in cooperation with the fourth lens element having positive refracting power or the eighth lens element having positive refracting power, the optical imaging lenses may balance the spherical aberration caused by the first lens element and the second lens element and reduce the distortion. Furthermore, in cooperation with the thicknesses of the lens elements and the air gaps satisfying T9/T8≥0.700 and D32t51/D12t31≥1.600, not only the system length may be reduced but also the assembly yield may be enhanced. A preferred range of T9/T8 and D32t51/D12t31 is respectively 0.700≤T9/T8≤1.100 and 1.600≤D32t51/D12t31≤5.300.

Moreover, the optical imaging lenses, when further satisfying the condition that the ninth lens element has negative refracting power, may increase the image height and enlarge the photosensitive area to improve image quality.

The optical imaging lenses may converge rays of different angles when satisfying the condition that the second lens element has negative refracting power, and may correct the aberration of the field of view at the center of the image plane and balance the spherical aberration caused by the first lens element and the second lens element in cooperation with the fourth lens element having positive refracting power, the convex optical axis region of the image-side surface of the fifth lens element, and the concave optical axis region of the image-side surface of the seventh lens element. Furthermore, in cooperation with the thicknesses of the lens elements and the air gaps satisfying T9/T8≥0.700 and D61t71/D12t31≥1.300, not only the system length may be reduced but also the assembly yield may be enhanced. A preferred range of T9/T8 and D61t71/D12t31 is respectively 0.700≤T9/T8≤1.100 and 1.300≤D61t71/D12t31≤4.600.

Moreover, the optical imaging lenses, when further satisfying the condition that the first lens element has positive refracting power or the eighth lens element has positive refracting power or the ninth lens element has negative refracting power, may decrease the f-number.

The transmission and deflection of imaging rays may be facilitated and the chromatic aberration may effectively be controlled, so that the optical imaging lenses may have excellent optical quality when the materials of the lens elements conform to the following configuration relations:

$V5+V6+V7 \leq 120.000$, which may preferably be $85.000 \leq V5+V6+V7 \leq 120.000$;

$V2+V3+V4 \leq 110.000$, which may preferably be $85.000 \leq V2+V3+V4 \leq 110.000$;

$V2+V5+V8 \leq 140.000$, which may preferably be $85.000 \leq V2+V5+V8 \leq 140.000$.

In order to shorten the system length and ensure the image quality of the lens elements, and in consideration of the difficulty in manufacturing, reducing the air gaps between the lens elements or appropriately decreasing the thicknesses of the lens elements may make the embodiments of the disclosure have better configuration if the numerical limitations of the following conditional expressions are satisfied:

$TTL/(G34+G45+G67) \leq 7.500$, which may preferably be $5.600 \leq TTL/(G34+G45+G67) \leq 7.500$;

$(AAG+BFL)/(T4+T6) \leq 3.900$, which may preferably be $1.900 \leq (AAG+BFL)/(T4+T6) \leq 3.900$;

$(T4+G45+T5)/(G12+T2) \geq 3.100$, which may preferably be $3.100 \leq (T4+G45+T5)/(G12+T2) \geq 6.900$;

$TL/(T8+G89+T9) \leq 4.200$, which may preferably be $2.750 \leq TL/(T8+G89+T9) \leq 4.200$;

$EFL/(T3+T5+G56) \geq 7.400$, which may preferably be $7.400 \leq EFL/(T3+T5+G56) \leq 9.850$;

$TTL/(T1+BFL) \leq 5.000$, which may preferably be $3.700 \leq TTL/(T1+BFL) \leq 5.000$;

$AAG/(T4+G67) \leq 3.600$, which may preferably be $2.300 \leq AAG/(T4+G67) \leq 3.600$;

$(T5+G56+T6)/(T2+G23) \geq 2.400$, which may preferably be $2.400 \leq (T5+G56+T6)/(T2+G23) \leq 5.150$;

$ALT/EFL \leq 1.400$, which may preferably be $0.600 \leq ALT/EFL \leq 1.400$;

$EFL/(T3+G78) \geq 9.000$, which may preferably be $9.000 \leq EFL/(T3+G78) \leq 20.500$;

$TL/(EFL+BFL) \leq 1.300$, which may preferably be $0.900 \leq TL/(EFL+BFL) \leq 1.300$;

$AAG/(T1+T8) \leq 2.500$, which may preferably be $1.000 \leq AAG/(T1+T8) \leq 2.500$;

$(T6+G67+T7)/(T4+G56) \geq 2.500$, which may preferably be $2.500 \leq (T6+G67+T7)/(T4+G56) \leq 6.750$;

$ALT/(G45+G89) \leq 3.800$, which may preferably be $2.250 \leq ALT/(G45+G89) \leq 3.800$.

In addition, any combination relationships of the parameters of the embodiments may be additionally selected to add limits to the optical imaging lens, so as to facilitate the optical imaging lens design of the same architecture of the disclosure.

In view of the unpredictability of an optical system design, under the architecture of the disclosure, the optical imaging lens, satisfying the foregoing conditional expressions, of the disclosure may have a small f-number, an increased image height, good imaging quality, or an enhanced assembly yield to overcome the defect in the prior art. In addition, the lens elements using the plastic materials in the embodiments of the disclosure may further reduce lens weight and save costs.

The above-listed exemplary limitation relational expressions may also be arbitrarily selectively incorporated in unequal numbers to be applied to the embodiments of the disclosure, and the disclosure is not limited thereto. During the implementation of the disclosure, in addition to the aforementioned relational expressions, detailed structures, such as the arrangement of concave and convex surfaces, of other more lenses may also be designed for a single lens element or broadly for multiple lens elements to enhance the system performance and/or control of the resolution. It should be noted that these details need to be selectively incorporated in other embodiments of the disclosure without conflicts.

The contents in the embodiments of the invention include but are not limited to a focal length, a thickness of a lens element, an Abbe number, or other optical parameters. For example, in the embodiments of the invention, an optical parameter A and an optical parameter B are disclosed, wherein the ranges of the optical parameters, comparative relation between the optical parameters, and the range of a conditional expression covered by a plurality of embodiments are specifically explained as follows:

(1) The ranges of the optical parameters are, for example, $\alpha_2 \leq A \leq \alpha_1$ or $\beta_2 \leq B \leq \beta_1$, where $\alpha_1$ is a maximum value of the optical parameter A among the plurality of embodiments, $\alpha_2$ is a minimum value of the optical parameter A among the plurality of embodiments, $\beta_1$ is a maximum value of the optical parameter B among the plurality of embodiments, and $\beta_2$ is a minimum value of the optical parameter B among the plurality of embodiments.

(2) The comparative relation between the optical parameters is that A is greater than B or A is less than B, for example.

(3) The range of a conditional expression covered by a plurality of embodiments is in detail a combination relation or proportional relation obtained by a possible operation of a plurality of optical parameters in each same embodiment. The relation is defined as E, and E is, for example, A+B or A−B or A/B or A*B or $(A*B)^{1/2}$, and E satisfies a conditional expression $E \leq \gamma_1$ or $E \geq \gamma 2$ or $\gamma_2 \leq E \leq \gamma_1$, where each of $\gamma_1$ and $\gamma_2$ is a value obtained by an operation of the optical parameter A and the optical parameter B in a same embodiment, $\gamma_1$ is a maximum value among the plurality of the embodiments, and $\gamma_2$ is a minimum value among the plurality of the embodiments.

The ranges of the aforementioned optical parameters, the aforementioned comparative relations between the optical parameters, and a maximum value, a minimum value, and the numerical range between the maximum value and the minimum value of the aforementioned conditional expressions are all implementable and all belong to the scope disclosed by the invention. The aforementioned description is for exemplary explanation, but the invention is not limited thereto.

The embodiments of the invention are all implementable. In addition, a combination of partial features in a same embodiment can be selected, and the combination of partial features can achieve the unexpected result of the invention with respect to the prior art. The combination of partial features includes but is not limited to the surface shape of a lens element, a refracting power, a conditional expression or the like, or a combination thereof. The description of the embodiments is for explaining the specific embodiments of the principles of the invention, but the invention is not limited thereto. Specifically, the embodiments and the drawings are for exemplifying, but the invention is not limited thereto.

What is claimed is:

1. An optical imaging lens, comprising a first lens element, a second lens element, a third lens element, a fourth lens element, a fifth lens element, a sixth lens element, a seventh lens element, an eighth lens element, and a ninth lens element sequentially arranged along an optical axis from an object side to an image side, wherein each of the first lens element to the ninth lens element comprises an object-side surface facing the object side and allowing imaging rays to pass through and an image-side surface facing the image side and allowing the imaging rays to pass through; wherein the first lens element has positive refracting power;
the second lens element has negative refracting power;
an optical axis region of the image-side surface of the fifth lens element is convex;
an optical axis region of the object-side surface of the seventh lens element is convex;
an optical axis region of the object-side surface of the eighth lens element is convex;
the fourth lens element has positive refracting power or the eighth lens element has positive refracting power;
lens elements of the optical imaging lens are only the nine lens elements, and the optical imaging lens satisfies:

$T9/T8 \geq 0.700$;

$D32t51/D12t31 \geq 1.600$; and $V5+V6+V7 \leq 120.000$;

wherein T9 is a thickness of the ninth lens element on the optical axis, T8 is a thickness of the eighth lens element on the optical axis, D32t51 is a distance from the image-side surface of the third lens element to the object-side surface of the fifth lens element on the optical axis, D12t31 is a distance from the image-side surface of the first lens element to the object-side surface of the third lens element on the optical axis, V5 is an Abbe number of the fifth lens element, V6 is an Abbe number of the sixth lens element, and V7 is an Abbe number of the seventh lens element.

2. The optical imaging lens according to claim 1, wherein the optical imaging lens further satisfies: $V2+V3+V4 \leq 110.000$, wherein V2 is an Abbe number of the second lens element, V3 is an Abbe number of the third lens element, and V4 is an Abbe number of the fourth lens element.

3. The optical imaging lens according to claim 1, wherein the optical imaging lens further satisfies: $TTL/(T1+BFL) \leq 5.000$, wherein TTL is a distance from the object-side surface of the first lens element to an image plane on the optical axis, T1 is a thickness of the first lens element on the optical axis, and BFL is a distance from the image-side surface of the ninth lens element to the image plane on the optical axis.

4. The optical imaging lens according to claim 1, wherein the optical imaging lens further satisfies: $AAG/(T4+G67) \leq 3.600$, wherein AAG is a sum of eight air gaps from the first lens element to the ninth lens element on the optical axis, T4 is a thickness of the fourth lens element on the optical axis, and G67 is an air gap between the sixth lens element and the seventh lens element on the optical axis.

5. The optical imaging lens according to claim 1, wherein the optical imaging lens further satisfies: $(T5+G56+T6)/(T2+G23) \geq 2.400$, wherein T5 is a thickness of the fifth lens element on the optical axis, G56 is an air gap between the fifth lens element and the sixth lens element on the optical axis, T6 is a thickness of the sixth lens element on the optical axis, T2 is a thickness of the second lens element on the optical axis, and G23 is an air gap between the second lens element and the third lens element on the optical axis.

6. The optical imaging lens according to claim 1, wherein the optical imaging lens further satisfies: $ALT/EFL \leq 1.400$, wherein ALT is a sum of thicknesses of the nine lens elements from the first lens element to the ninth lens element on the optical axis, and EFL is an effective focal length of the optical imaging lens.

7. The optical imaging lens according to claim 1, wherein the optical imaging lens further satisfies: $EFL/(T3+G78) \geq 9.000$, wherein EFL is an effective focal length of the optical imaging lens, T3 is a thickness of the third lens element on the optical axis, and G78 is an air gap between the seventh lens element and the eighth lens element on the optical axis.

* * * * *